(12) United States Patent
Sim

(10) Patent No.: US 11,000,928 B2
(45) Date of Patent: May 11, 2021

(54) MACHINING CENTER

(71) Applicant: DOOSAN MACHINE TOOLS CO., LTD., Changwon-si (KR)

(72) Inventor: Jae-doo Sim, Gimhae-si (KR)

(73) Assignee: DOOSAN MACHINE TOOLS CO., LTD., Changwon-si (KR)

(*) Notice: Subject to any disclaimer, the term of this patent is extended or adjusted under 35 U.S.C. 154(b) by 321 days.

(21) Appl. No.: 16/304,245

(22) PCT Filed: Apr. 13, 2017

(86) PCT No.: PCT/KR2017/003992
§ 371 (c)(1),
(2) Date: Nov. 23, 2018

(87) PCT Pub. No.: WO2017/204463
PCT Pub. Date: Nov. 30, 2017

(65) Prior Publication Data
US 2020/0316736 A1    Oct. 8, 2020

(30) Foreign Application Priority Data

May 24, 2016  (KR) .......................... 10-2016-0063581

(51) Int. Cl.
*B23Q 3/154*  (2006.01)
(52) U.S. Cl.
CPC .................... *B23Q 3/154* (2013.01)
(58) Field of Classification Search
CPC ...... B23Q 1/0054; B23Q 15/20; B23Q 15/22; B23Q 15/24; B23Q 3/16; B23Q 3/186; B23Q 17/22–2291
See application file for complete search history.

(56) References Cited

U.S. PATENT DOCUMENTS

2001/0047701 A1* 12/2001 Nakai ............... B23Q 11/0053
82/117
2012/0243956 A1* 9/2012 Yamazaki ............. B23C 1/002
409/80

FOREIGN PATENT DOCUMENTS

JP       8-206935 A      8/1996
JP       08-294840 A    11/1996
(Continued)

OTHER PUBLICATIONS

International Search Report for corresponding international application PCT/KR2017/003992 dated Jun. 21, 2017, citing the above references.
(Continued)

*Primary Examiner* — Tyrone V Hall, Jr.
(74) *Attorney, Agent, or Firm* — STIP Law Group, LLC

(57) ABSTRACT

Disclosed is a machining center. The machining center includes a bed structure deflected along a deflection curve by a load distribution thereon, a palette structure secured to a first end portion of the bed structure, a spindle assembly to which a machining tool is secured and secured to a second portion of the bed structure, a table movably secured to the bed structure such that a table loading is applied to a load point of the bed structure and an automatic aligner automatically detecting first and second installation errors of the table and the spindle assembly and automatically correcting the first and the second installation errors such that the workpiece and the tool are aligned with each other. The misalignment between the workpiece and the tool is automatically detected and corrected in the machining center.

18 Claims, 9 Drawing Sheets

(56) References Cited

FOREIGN PATENT DOCUMENTS

| JP | 2006/007397 A | 1/2006 |
|---|---|---|
| KR | 10-0976899 B1 | 8/2010 |
| KR | 10-2012-0069056 A | 6/2012 |
| KR | 10-2015-0053542 A | 5/2015 |
| WO | 2015/063912 A1 | 5/2015 |

OTHER PUBLICATIONS

The extended European Search Report dated Nov. 27, 2019 in connection with the counterpart European Patent Application No. 17802982.3, citing the above reference(s).
Junxu Ma, et al., Assembly errors analysis of linear axis of CNC machine tool considering component deformation, The International Journal of Advanced Manufacturing Technology, Dec. 7, 2015, p. 281-289, vol. 86, No. 1, Springer, London, cited NPL No. 1.

\* cited by examiner

MACHINING CENTER

CROSS-REFERENCE TO RELATED APPLICATION

This application claims priority under 35 USC § 119 to Korean Patent Application No. 10-2016-0063581, filed on May 24, 2016, in the Korean Intellectual Property Office (KIPO), the content of which is incorporated by reference herein in its entirety.

BACKGROUND

1. Field

The present inventive concepts relate to a machining center, and more particularly, to a horizontal machining center.

2. Description of the Related Art

Recently, a plurality of machining centers has been widely used for machining mechanical products in which most of machining processes for manufacturing the mechanical products can be automatically controlled under numerical control algorithms. For example, the boring process, the milling process, the reaming process and the rapping process can be executed on the same machining center just by automatically changing the machining tools.

Particularly, a horizontal machining center is usually composed of a bed structure, a palette arranged at front end of the bed structure and having a workpiece therein, a spindle assembly arranged at a rear end of the bed structure and to which the machining tool is selectively combined and a table movably secured to the bed structure in such a way that the table can move on the bed structure between the palette and the spindle assembly. The workpiece is secured to the table and can be transferred between the palette and the spindle assembly just by the movement of the table.

The workpiece in the palette is transferred and secured to the table and then the table is driven to move to a machining position. The table having the workpiece is then secured to the table at the machining position and the spindle assembly is aligned with the workpiece in such a way that the center of the workpiece and the center of the machining tool coincides with each other. Thus, the spindle assembly to which the machining tool is combined is ready for the machining process to the workpiece.

Therefore, various loadings such as a static loading and a dynamic or variable loading are applied to the table structure in the machining center. For example, the load of the palette may be variable whether or not the workpiece is included in the palette and the loads of the spindle assembly and the workpiece may usually be constant in the operation of the machining center. In addition, variable moments may be applied to the bed structure as the loading positions of the palette and the workpiece are changed on the bed structure.

Because the bed structure is usually shaped into a slender member having a length much greater than a width, the deformation of the bed structure is also varied according to the load distribution of the bed structure. When the bed structure may be deformed in the longitudinal direction, an upper slope may occur on the upper surface of the bed structure in the longitudinal direction and as a result, the vertical axis of the table and the vertical beam of the spindle assembly may become slanted as much as the upper slope, which is referred as installation error of the table and the installation error of the spindle assembly, respectively.

The installation errors of the table and the spindle assembly necessarily cause the misalignment between the workpiece and the machining tool secured to the spindle assembly.

Accordingly, there has been needed a new horizontal machining center in which the installation errors of the table and the spindle assembly is corrected and the workpiece and the machining tool are accurately aligned with each other in the longitudinal direction irrespective of the bed deformation along the longitudinal direction.

SUMMARY

Example embodiments of the present inventive concept provide a machining center for automatically detecting and correcting the installation errors of the table and the spindle assembly to thereby accurately align the workpiece and the machining tool along the common central axis.

According to some example embodiments of the present inventive concepts, there is provided a machining center including a bed structure deflected in a longitudinal direction along a deflection curve by a load distribution thereon and having a pair of position sensors detecting bed heights at a minimal deflection point and a maximal deflection point, respectively, a palette structure having a palette for selectively holding a standby workpiece and secured to a first end portion of the bed structure such that a palette loading may be applied to the first end portion of the bed structure, a spindle assembly to which a machining tool may be secured and secured to a second end portion opposite to the first end portion of the bed structure such that a spindle loading may be applied to the bed structure, a table movably secured to the bed structure such that a manufacturing workpiece may be secured to the table and a table loading may be applied to a load point of the bed structure, and an automatic aligner automatically detecting a first installation error of the table and a second installation error of the spindle assembly and automatically correcting the first and the second installation errors such that the machining workpiece and the machining tool may be aligned with each other.

In example embodiments, the automatic aligner may include a position detecting unit detecting the bed heights of the bed structure and process positions of the bed structure at which the table may be located, an error calculating unit for calculating the installation errors of the table and the spindle assembly according to the bed heights and the process positions and a driving unit for driving at least one of the table and the spindle assembly to correct the installation errors of the table and the spindle assembly.

In example embodiments, the position detecting unit may include a first detecting unit connected to the position sensors and detecting the bed heights from the ground and a second detecting unit detecting the process position at which the table may be located as the load point. The error calculating unit may include a deflection sensor detecting a deflection of the bed structure from the deflection curve as a bed slant and an error generator generating the first and the second installation errors from the bed slant.

In example embodiments, the load distribution may be varied by palette loading, the table loading and the spindle loading and the position sensor may include a first gap sensor positioned under the maximal deflection point of the bed structure and a second gap sensor positioned under the minimal deflection point of the bed structure. The bed structure may be divided into a plurality of bed sections and the deflection curve may be simplified into a discrete line in each bed section by a linear regression analysis. The discrete line may include a first deflection line having a first bed slant inclined at a first slant angle with respect to an original shape of the bed structure and extending downwards from the maximal deflection point to the minimal deflection point and a second deflection line having a second bed slant inclined at a second slant angle with respect to the original shape of the bed structure and extending upwards from the minimal deflection point to the maximal deflection point. The first slant angle may be obtained by a following equation (1) and the second slant angle may be obtained by a following equation (2).

$$\theta_1 = \tan^{-1}\left(\frac{G_2 - G_1}{d_3 - d_1}\right) \quad (1)$$

$$\theta_2 = \tan^{-1}\left(\frac{h_2 - G_2}{d_4 - d_3}\right) \quad (2)$$

(wherein, θ1 represents the first slant angle, θ2 represents the second slant angle, h1 represents the bed height of the bed structure at the first end portion, h2 represents the bed height of the bed structure at the second end portion, G1 represents the bed height of the bed structure at the maximal deflection point, G2 represents the bed height of the bed structure at the minimal deflection point, d1 is a gap distance between the first end portion of the bed structure and the maximal deflection point, d3 is a gap distance between the first end portion of the bed structure and the minimal deflection point and d4 is a gap distance between the first end portion and the second end portion of the bed structure.)

In example embodiments, when the second detecting unit may detect the table at the load point satisfying a following equation (3), the error generator may generate the first installation error and the second installation error as the first slant angle and the second slant angle, respectively.

$$d_2 < d_3 - l\cos\frac{\theta_1}{2} \quad (3)$$

(wherein, l represents a length of the bed structure and d2 represents a gap distance between the first end portion of the bed structure and the load point of the table loading).

In example embodiments, when the second detecting unit may detect the table at the load point satisfying a following equation (4), the error generator may generate the first installation error and the second installation error as the second slant angle, $$d_2 > d_3 - l\cos\frac{\theta_1}{2} \quad (4)$$

(wherein, l represents a length of the bed structure and d2 represents a gap distance between the first end portion of the bed structure and the load point of the table loading).

In example embodiments, when the second detecting unit may detect the table at the load point satisfying a following equation (5), the error generator may generate the second installation error as the second slant angle and may generate the first installation error as a supplementary angle of a slope of a table line in such a configuration that the table line may pass a left contact point at which a left end of the table may be contact with the bed structure deflected along a first deflection line and a right contact point at which a right end of the table may be contact with the bed structure deflected along the second deflection line.

$$d_3 - l\cos\frac{\theta_1}{2} < d_2 < d_3 + l\cos\frac{\theta_2}{2} \quad (5)$$

(wherein, l represents a length of the bed structure and d2 represents a gap distance between the first end portion of the bed structure and the load point of the table loading).

In example embodiments, the first installation error may be calculated by a following equation (6), $$\alpha_1 = \tan^{-1}\left(\frac{\tan\theta_2(A\Delta x + B) + \frac{1}{2}\tan\theta_2\sqrt{C\Delta x^2 + D\Delta x + E} - l\sin\theta_1 + \Delta x\tan\theta_1}{A\Delta x + B + \frac{1}{2}\sqrt{C\Delta x^2 + D\Delta x + E} + l\cos\theta_1 - d}\right) - 90 \quad (6)$$

(wherein, l represents a length of the bed structure and Δx represents a horizontal component of a displacement of the left end of the table when a right end of the table move along a second deflection line, A=−2 cos² θ₁ (tan θ₁ tan θ₂−1), B=−2 cos²θ₁(l cos θ₁−l sin θ₁ tan θ₂), C=−3−2 tan θ₁ tan θ₂+tan²θ₁ tan² θ₂

D=2/(−cos θ₁+sin θ₁ tan θ₂+cos θ₁ tan θ₁ tan θ₂−sin θ₁ tan θ₁ tan²θ₂+4 sin²θ₁ cos θ₁)

E=l(l cos θ₁−2l sin θ₁ cos θ₁ tan θ₂+l sin²θ₁ tan²θ₂+8 cos³θ₁)).

In example embodiments, the load distribution may be varied by palette loading, the table loading and the spindle loading and the position sensor may include a gap sensor positioned under the minimal deflection point of the bed structure. The bed structure may be divided into a pair of bed sections and the deflection curve may be simplified into a discrete line in each bed section by a linear regression analysis such that the line includes a first deflection line and a second deflection line. The first deflection line may have a first bed slant inclined at a first slant angle with respect to an original shape of the bed structure and extending downwards from the first end portion of the bed structure to the minimal deflection point and the second deflection line may have a second bed slant inclined at a second slant angle with respect to the original shape of the bed structure and extending upwards from the minimal deflection point to the second end portion of the bed structure. The first slant angle nay be obtained by a following equation (7) and the second slant angle may be obtained by a following equation (8).

$$\theta_1 = \tan^{-1}\left(\frac{h_1 - G}{d_3}\right) \quad (1)$$

$$\theta_2 = \tan^{-1}\left(\frac{h_2 - G}{d_4 - d_3}\right) \quad (2)$$

(wherein, θ1 represents the first slant angle, θ2 represents the second slant angle, h1 represents the bed height of the bed structure at the first end portion, h2 represents the bed height of the bed structure at the second end portion, G represents the bed height of the bed structure at the minimal deflection point, d3 is a gap distance between the first end portion of the bed structure and the minimal deflection point and d4 is a gap distance between the first end portion and the second end portion of the bed structure).

In example embodiments, when the second detecting unit may detect the table at the load point satisfying a following equation (9), the error generator may generate the first installation error and the second installation error as the first slant angle and the second slant angle, respectively.

$$d_2 < d_3 - l\cos\frac{\theta_1}{2} \qquad (9)$$

(wherein, l represents a length of the bed structure and d2 represents a gap distance between the first end portion of the bed structure and the load point of the table loading).

In example embodiments, when the second detecting unit may detect the table at the load point satisfying a following equation (10), the error generator may generate the first installation error and the second installation error as the second slant angle, $$d_2 > d_3 - l\cos\frac{\theta_1}{2} \qquad (10)$$

(wherein, l represents a length of the bed structure and d2 represents a gap distance between the first end portion of the bed structure and the load point of the table loading).

In example embodiments, when the second detecting unit may detect the table at the load point satisfying a following equation (11), the error generator may generate the second installation error as the second slant angle and may generate the first installation error as a supplementary angle of a slope of a table line in such a configuration that the table line may pass a left contact point at which a left end of the table may be contact with the bed structure deflected along a first deflection line and a right contact point at which a right end of the table may be contact with the bed structure deflected along the second deflection line.

$$d_3 - l\cos\frac{\theta_1}{2} < d_2 < d_3 + l\cos\frac{\theta_2}{2} \qquad (11)$$

(wherein, l represents a length of the bed structure and d2 represents a gap distance between the first end portion of the bed structure and the load point of the table loading).

In example embodiments, the second detecting unit may include a servo motor for driving the table and a motor encoder detecting operation information of the servo motor.

In example embodiments, the error calculating unit may further include a palette sensor detecting whether or not the standby workpiece may be hold in the palette from the bed height corresponding to the maximal deflection point.

In example embodiments, the deflection curve may include a continuous polynomial curve in the longitudinal direction and the error generator may generate the first installation error as a slant angle of an instantaneous slope of the polynomial curve at the load point of the table loading and may generate the second installation error as a slant angle of an instantaneous slope of the polynomial curve at the second end portion of the bed structure.

In example embodiments, the driving unit may include a table driver for rotating the table at a first correction angle and a spindle driver for rotating a transfer column of the spindle assembly at a second correction angle.

In example embodiments, the table driver and the spindle driver may be operated complementary to each other under a condition that one of the first correction angle and the second correction angle may include a summation of the first installation error and the second installation error.

In example embodiments, the table driver and the spindle driver may be simultaneously operated under a condition that the first correction angle may include the first installation error and the second correction angle may include the second installation error.

In example embodiments, the automatic aligner further may include a storing unit for storing configurations and installation specifications of the bed structure as digital data.

According to example embodiments of the present inventive concepts, the load distribution to the bed structure and the load point of the table loading may be automatically detected and the deflection curve of the bed structure may be generated based on the load distribution and the load point of the table loading. Then, the bed deflections and the installation errors may be automatically obtained from the deflection curve, and at least one of the table and the spindle assembly may be automatically rotated for aligning the machining workpiece and the machining tool. Therefore, the misalignment between the machining workpiece and the machining tool may be automatically detected and corrected in the machining center, thereby increasing the machining precision of the machining center.

BRIEF DESCRIPTION OF THE DRAWINGS

Example embodiments will be more clearly understood from the following detailed description taken in conjunction with the accompanying drawings which represent non-limiting, example embodiments as described herein.

DESCRIPTION OF EMBODIMENTS

Figure 1:
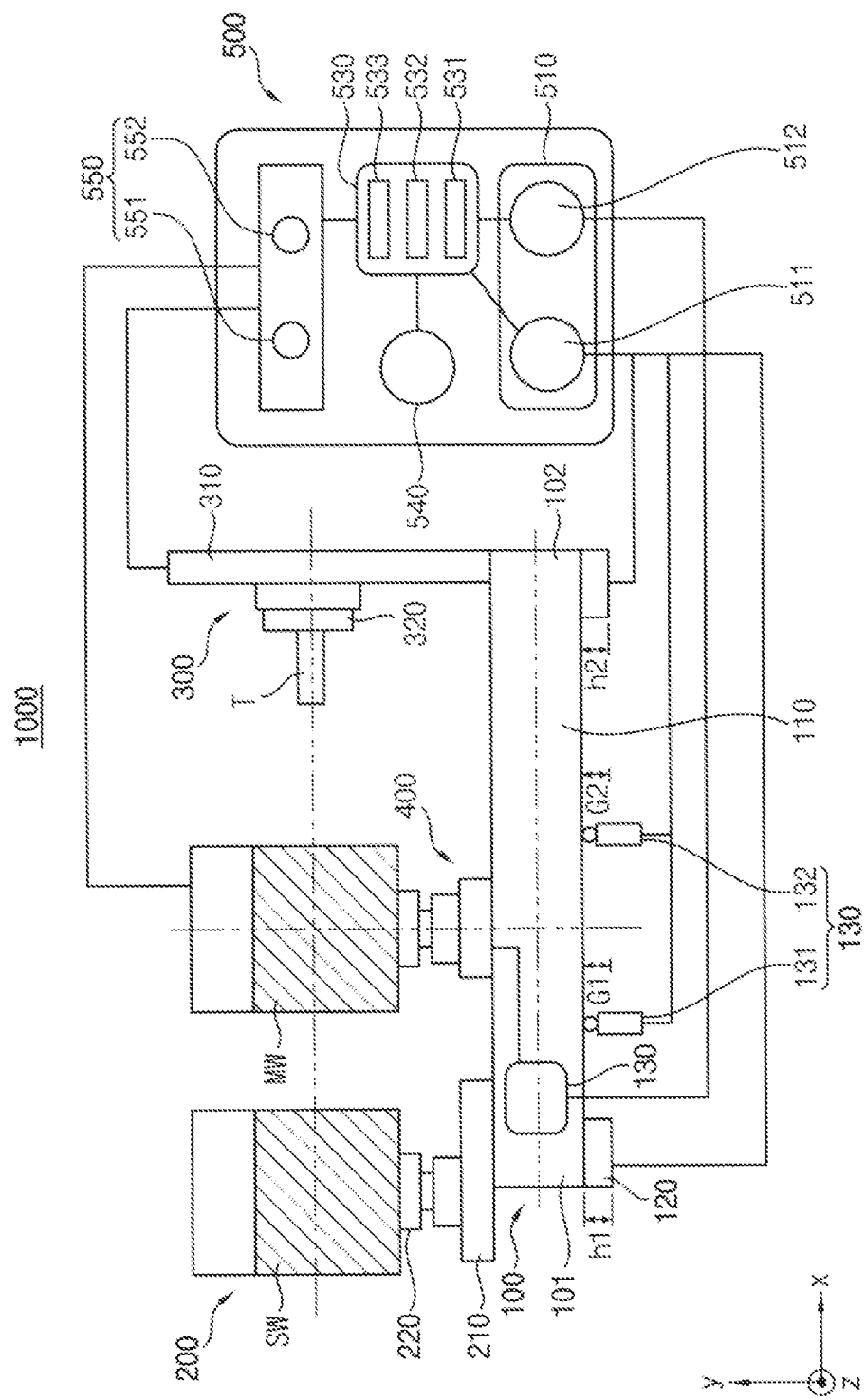
FIG. 1 is a structural view illustrating a machining center in accordance with an example embodiment of the present inventive concept.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, and/or sections, these elements, components, regions, and/or sections should not be limited by these terms. These terms are only used to distinguish one element, component, region, and/or section from another element, component, region, and/or section. For example, a first element, component, region, and/or section could be termed a second element, component, region, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a structural view illustrating a machining center in accordance with an example embodiment of the present inventive concept. While the present example embodiment discloses that a horizontal machining center in which the principal axis of the spindle is horizontal in parallel with the upper surface of the table may be exemplarily provided as the machining center, any other machining centers such as a vertical machining center may also be provided as the machining center as long as the length of the bed structure is much greater than the width of the bed structure.

Referring to FIG. 1, a machining center 1000 in accordance with an example embodiment of the present inventive concept may include including<< >>.

For example, the bed structure 100 may include a solid body having a sufficient strength and rigidity for the palette structure 200, the spindle assembly 300 and the table 400 and may be shaped into a slender member of which the length in a first direction x may be much greater than the width in a third direction z.

The palette structure 200 may be positioned at a first end portion 101 of the bed structure 100 and the spindle assembly 300 may be positioned at a second end portion 102 of the bed structure 100 opposite to the first end portion 101 in the first direction x that may be in parallel with a longitudinal direction x of the bed structure. The spindle assembly 300 may be integrally provided with a column structure (not shown) of the machining center 1000 in one body. A plurality of supporting machines such as an automatic tool changer (ATC) and an automatic attachment changer (AAC) may be arranged at a side of the column structure of the machining center close to the spindle assembly 300.

The first end portion 101 of the bed structure 100 may function as a free end of the slender member and the second end portion 102 of the bed structure 100 may function as a fixed end of the slender member. That is, the palette structure 200 may be positioned on the free end of the slender bed structure 100 and the spindle assembly 300 may be positioned on the fixed end of the slender bed structure 100.

For example, the bed structure 100 may include a body 110 shaped into a 3-dimensional cube and having a sufficient strength and rigidity and a bed support 120 supporting the body 110 at the first and the second end portions 101 and 102 and controlling installation heights h1 and h2 of the bed structure 100.

Particularly, the bed support 120 include a level controller (not shown) for controlling an upper surface of the bed structure 100 to be flat along the first direction x irrespective of the flatness of the ground on which the bed structure 100 may be positioned. In the present example embodiment, the bed support 120 may support the body 110 in such a configuration that the first end portion 101 may be spaced apart from the ground by a first height h1 and the second end portion 102 may be spaced apart from the ground by a second height h2.

The body 110 may include a receiver (not shown) for holding the table 400 on the upper surface and a table driver 130 may be provided with the body 110. For example, the table driver 130 may be installed to a side of the body 110 or inside the body 110. In the present example embodiment, the table driver 130 may include a servo motor for generating a variable rate output power according to the loadings of a manufacturing workpiece MW.

When the palette structure 200, the spindle assembly 300 and the table 400 may be mounted onto the bed structure 100, a distribution load may be continuously applied onto the bed structure in the first direction x. Thus, the bed structure 100 may be deformed in the first direction x in relation with material properties of the bed structure 100. Hereinafter, the loading of the palette structure 200 is referred to as palette loading PL in FIG. 2 and the loading of the table 400 is referred to as table loading TL in FIG. 2. In addition, the loading of the spindle assembly 300 is referred to as spindle loading SL in FIG. 2.

In such a case, at least a pair of position detectors 130 may be arranged under the body 110 for detecting the vertical deflection of the bed structure 100 along a second direction x. The vertical deflection of the bed structure 100 may be varied according to the load distribution onto the bed structure 100 due to the palette loading PL, table loading TL and the spindle loading SL.

The position detector 130 may include a pair of first and second gap sensors 131 and 132 that may be positioned at a maximal deflection point and a minimal deflection point, respectively. The maximal and minimal deflection points may be obtained by various computer simulations as follows. Assuming that the palette loading, the table loading TL and the spindle loading SL may be sequentially applied to the bed structure 100 from the first end portion 101 in the first direction x, the computer simulation for generating the vertical deflection curve may be repeatedly conducted for every combination of position and intensity of the palette loading PL, table loading TL and the spindle loading SL. Then, a plurality of the deflection curves may be arithmetically overlapped and an average common minimal point and an average common maximal point may be selected as the minimal deflection point and the maximal deflection point. Then, the first gap sensor 131 may be positioned under the body 110 at a first position corresponding to the maximal deflection point and the second gap sensor 132 may be positioned under the body at a second position corresponding to the minimal deflection point.

Accordingly, the first gap sensor 131 may detect a first gap distance at the first position as a distance between the ground and the body 110 and the second gap sensor 132 may detect a second gap distance at the second position as a distance between the ground and the body 110

The palette structure 200 may include a palette support 210 and a palette 220 detachably secured to the palette support 210 and holding a standby workpiece SW. The palette 220 may be transferred between the palette support 210 and the table 400 and may substitute the machining workpiece MW with the standby workpiece SW, so that the machining processed may be subsequently conducted to every workpiece in the machining center 1000.

In the present example embodiment, the palette structure 200 may include an automatic palette changer (ATC) for automatically transferring the palette 220 between a standby area in which the palette support 210 may be positioned and a machining area in which the table 400 may be positioned according to the numerical control algorithms.

The standby workpiece SW may be transferred to the table 400 in the machining area from the palette support 220 in the standby area under the control of the numerical control algorithms. Thus, the standby workpiece SW may be transformed into the manufacturing workpiece MW and an expected machining process may be conducted to the manufacturing workpiece MW in the processing area.

When manufacturing the manufacturing workpiece MW in the processing area, another palette 200 holding another standby workpiece SW may be selectively mounted on the palette support 210 and may be ready for the next manufacturing process. The present manufacturing workpiece MW may be automatically transferred to the standby area from the machining area by the palette 220 and another standby workpiece SW may be transferred to the machining area by the palette 220 for the next manufacturing process. Accordingly, the manufacturing process may be continuously conducted in the machining center 1000 without interrupt for providing the workpiece to the standby area.

The palette structure 200 may be positioned at the first end portion 101 of the bed structure 100 and the palette loading PL may be applied to the first end portion 101 of the bed structure 100. Thus, a relatively large bending stress may be generated in the bed structure 100 and the bed structure 100 may be deflected downwards by the bending stress in the first direction x.

Particularly, since the standby workpiece SW may be selectively included in the palette 220 and no standby workpiece may be provided with the palette structure 200 while the table 400 and the spindle structure 300 may be combined with the bed structure 100, the palette loading PL may be variable according to the standby workpiece SW and the table loading TL and the spindle loading SL may be approximately constant in operating the machining center 1000. Thus, the load distribution of the bed structure 100 may be variable in the first direction x according to the standby workpiece SW in the palette structure 200, and the vertical deflection of the bed structure 100 may be changed according to the standby workpiece SW in the first direction x. The vertical deflection of the bed structure 100 may cause the installation errors of the table 400 and the spindle assembly 300.

A column structure (not shown) may be provided around the second end portion 102 of the bed structure 100 in the second direction y and the spindle assembly 300 may be secured to the second end portion 102 of the bed structure 100. A control box (not shown) may also be provided around the column structure. The palette structure 200, the table 300, the spindle assembly 400 and an automatic aligner 500, which will be described in detail hereinafter, may be systematically controlled by the control box together with various supporting machines such as the ATC and AAC under the numerical control algorithms. That is, the manufacturing workpiece MW may be automatically manufactured under the numerical control of the control box.

The spindle assembly 300 may be integrally provided with the column structure in one body, and may include a transfer column 310 movably secured to the second end portion 102 of the bed structure 100 and a spindle head 320 rotatably secured to the transfer column 310. The machining tool T for processing the machining workpiece MW may be combined to the spindle head 320. The spindle head 320 may move in a space over the bed structure 100 as the transfer column 310 may move in the first, the second and the third directions x, y and z. In addition, the spindle head 320 may rotate with respect to the third direction z perpendicular to the first and the second directions x and y, and the slant angle of the machining tool T with respect to the transfer column 310 may be controlled by the rotation of the spindle head 320.

A center of machining workpiece MW, which may be secured to the table 400, and the machining tool T, which may be combined to the spindle head 320, may be accurately aligned with each other by accurately controlling the positions of the table 400 and the spindle head 320.

The table 400 may be positioned at the receiver of the bed structure 100 and the machining workpiece MW may be secured to the table 400. In the present example embodiment, the machining workpiece MW may be secured to the table 400 in such a configuration that the machining workpiece MW may be hold to the palette 220 and the palette 220 including the machining workpiece MW may be separated from the table 400 when completing the process to the machining workpiece MW.

The structures and shapes of the table 400 may be variable according to the environments and characteristics of the machining process. The table 400 may be integrally provided with the machining center 1000 in one body or may be individually provided to the machining center 1000 according to the machining process. Thus, the table 400 may be detachably secured to the bed structure 100 and may be exchanged according to the machining process.

In addition, the gap distance between the table 400 and the spindle assembly 300 may be controllable according to the specifications of the tool T and the characteristics of the machining process. For example, when the machining process may include a penetration process through the workpiece by using a relatively long tool T, the table 400 may move on the upper surface of the bed structure 100 in such a way that the gap distance between the table 400 and the spindle assembly 300 may be sufficiently long for the penetration process through the workpiece. In contrast, when the machining process may include a surface process onto a surface of the workpiece by using a relatively short tool T, the table 400 may move on the upper surface of the bed structure 100 in such a way that the gap distance between the table 400 and the spindle assembly 300 may be sufficiently short for the surface process onto the surface of the workpiece.

Particularly, the table 400 may be arranged on the upper surface of the bed structure 100 in such a configuration that a central axis of the table 400 may be substantially perpendicular to the upper surface of the bed structure 100. Hereinafter, the central axis of the table 400 substantially perpendicular to the upper surface of the original bed structure 100 from which no deflection may occur is referred to as reference table axis 401a. The manufacturing workpiece MW may be secured to the table 400 with reference to the reference table axis 401a.

The machining tool T may be combined to the spindle head 320 having a head shaft (not shown) in parallel with the upper surface of the bed structure 100 and substantially perpendicular to the transfer column 310. Thus, the machining tool T may be in parallel with the upper surface of the bed structure 100 and be aligned with the center of the machining workpiece MW. The center of the machining tool T may be accurately aligned with the center of the machining workpiece MW by the movement of the spindle head 320 in the space over the bed structure 100 defined by a rectangular coordinate system shown in FIG. 1.

Thus, the palette loading PL, the table loading TL and the spindle loading SL may be applied to the bed structure 100 in the first direction x. The palette loading TL may include the loads of the standby workpiece SW and the palette 220 and may be applied to the first end portion 101 of the bed structure 100. The spindle loading SL may be applied to the second end portion 102 of the bed structure 100. The table loading TL may include the loads of the manufacturing workpiece and the table 400 and may be applied to variable process positions of the bed structure 100. The process position of the table 400 may be varied according to the movement of the table 400.

The slender-shaped bed structure 100 may be continuously deformed in the first direction x according to the load distribution on the upper surface thereof and may be vertically deflected along the second direction y, thereby generating a deflection curve of the bed structure 100 in the first direction x. Thus, the deflection curve may indicate the vertical deflections at any positions along the first direction x and the vertical deflection may indicate the vertical deformation of the bed structure in the second direction y. Since the various loadings may be continuously applied to the bed structure 100 in the first direction x, the deflection curve may include at least a local extremum point.

The deflection curve may be provided as a single continuous curve or as a plurality of discrete curves that may be divided into bed sections of the bed structure 100 according to the local extremum point. The discrete curve may be expressed as approximated linear equation and the continuous curve may be expressed as a polynomial equation of the deflection curve generated from the computer simulation.

Particularly, the palette loading PL may be an optional loading that may be selectively applied to the bed structure 100 according to the characteristics of the machining process. However, the optional palette loading PL may have relatively much effect on the deflection curve because the palette loading PL may be applied to the free end portion of the slender-shaped bed structure 100. Since the vertical axes of the table 400 and the spindle assembly 300 may be slanted according to the deformation of the bed structure 100, the installation errors of the table 400 and the spindle assembly 300 may be much more influenced by the palette loading PL.

An automatic aligner 500 may be further provided with the machining center 1000. The installation errors of the table 400 and the spindle assembly 300 may be automatically corrected and the machining workpiece MW and the machining tool T may be accurately aligned with each other by the automatic aligner 500 prior to the machining process.

The automatic aligner 500 may be integrally provided as the control box in one body or may be provided as an individual instrument.

For example, the automatic aligner 500 may include a position detecting unit 510 detecting a height of the bed structure 100 and the process position at which the table 400 may be located, an error calculating unit 530 for calculating the installation errors of the table 400 and the spindle assembly 300 and a driving unit 550 for driving the table 400 and the spindle assembly 300 to correct the installation errors of the table 400 and the spindle assembly 300.

The position detecting unit 510 may include a first detecting unit 511 for detecting the height of the bed structure from the ground and a second detecting unit 512 for detecting the process position along the first direction x.

The first detecting unit 511 may detect the first and the second installation heights h1 and h2 and the first and second bed heights G1 and G2. For example, the first detecting unit 511 may detect the first installation height h1 of the bed structure 100 from the first end portion 101 and the second installation heights h2 of the bed structure 100 from the second end portion 102 by a positioned sensor (not shown) in the bed support 120. Further, the first detecting unit 511 may also detect the first and the second gap distances from the first and the second gap sensors 131 and 132 as the first and second bed heights G1 and G2. That is, the first bed height G1 may include the first gap distance between the body 110 of the bed structure 100 and the ground at the first position corresponding to the maximal deflection point of the deflection curve and the second bed height G2 may include the second gap distance between the body 110 of the bed structure 100 and the ground at the second position corresponding to the minimal deflection point of the deflection curve.

When all of the palette loading PL, the table loading TL and the spindle loading SL may be applied to the bed structure 100, the deflection curve may generally have at least one of the maximal deflection point and at least one of the minimal deflection point. Then, the first gap sensor 131 may be positioned under the body 110 at the first position corresponding to the maximal deflection point and the second gap sensor 132 may be positioned under the body at a second position corresponding to the minimal deflection point. The first gap distance between the body 110 and the ground may be detected by the first gap sensor 131 and may be transferred to the first detecting unit 511 as the first bed height G1 at the maximal deflection point. In the same way, the second gap distance between the body 110 and the ground may be detected by the second gap sensor 132 and may be transferred to the first detecting unit 511 as the second bed height G1 at the minimal deflection point.

While the present example embodiment discloses that the first and the second installation heights h1 and h2 may be detected by the position sensor in the bed support 120, the first and the second installation heights h1 and h2 may also be obtained from the computational calculations by using the specifications and installation requirements of the bed structure 100 that may be stored in a storing unit 540. The storing unit will be described in detail hereinafter.

The second detecting unit 512 may detect the position of the table 400 on the bed structure 100. Since the machining workpiece MW may be secured to the table 400, the machining process may be conducted at the position of the table 400, so that the position of the table 400 may function as the process position at which the machining process may be conducted to the machining workpiece MW and function as a load point to which the table loading TL may be applied. The process position or the load point of the table loading may be varied along the first direction x due to the characteristics and the environments of the machining process.

In the present example embodiment, the table 400 may be driven by a servo motor of which the rated output power may be controlled in relation with the load of the machining workpiece MW, and the second detecting unit 512 may include a motor encoder (not shown) detecting operation information of the servo motor. For example, the motor encoder may detect a revolution speed, a revolution direction and a rotated angle and may calculate a linear distance traveling in the first direction x by the servo motor. Then, the second detecting unit 512 may obtain the present position of the table 400 from the linear distance traveled by the servo motor and an initial position of the table 400.

The vertical deflection of the bed structure 100 and a horizontal displacement of the table 400 may be obtained by the position detecting unit 510 and the installation errors of the table 400 and the spindle assembly 300 may be calculated from the vertical deflection of the bed structure 100 and a horizontal displacement of the table 400.

For example, the error calculating unit 530 may include a palette sensor 531 for detecting whether or not the standby workpiece SW may be hold in the palette 220 from the first bed height G1 of the maximal deflection point, a deflection sensor 532 for detecting the deflection of the bed structure 100 at each point of the bed structure 100 as a bed slant, and an error generator 533 for generating the installation errors from the bed slant. The bed slant may be measured by a slant angle θ.

When the palette loading PL may be applied to the first end portion 101 of the bed structure 100, a tensile stress may be applied to the upper surface of the bed structure 100 between the palette structure 200 and the table 400 and a compressive stress may be applied to the upper surface of the bed structure 100 between the table 400 and the spindle assembly 300. Thus, the tensile deformation may be generated to the bed structure 100 between the palette structure 200 and the table 400 and the maximal deflection point may be arranged between the palette structure 200 and the table 400. In contrast, the compressive deformation may be generated to the bed structure 100 between the table 400 and the spindle assembly 300 and the minimal deflection point may be arranged between the table 400 and the spindle assembly 300.

The first bed height G1 at the maximal deflection point may be detected by the first gap sensor 131 and the second bed height G2 at the minimal deflection point may be detected by the second gap sensor 132.

In contrast, when the palette loading PL may be negligible at the first end portion 101 or no palette loading PL may be applied to the first end portion 101 of the bed structure 100, the maximal deflection point may not be found between the palette structure 100 and the table 400 and only the minimal deflection point may be arrange between the table 400 and the spindle assembly 300.

That is, the first bed height G1 may be significantly varied according to the intensity of the palette loadings PL while the second bed height G2 may be less influenced by the intensity of the palette loadings PL.

When the first and the second bed heights G1 and G2 may be detected by the position detecting unit 510, the palette sensor 531 may determine whether or not the standby workpiece SW may be hold in the palette 220 from the first bed height G1 of the maximal deflection point and an installation height of the bed structure 100 corresponding to the maximal deflection point. In the present example embodiment, the installation height of the bed structure 100 of the maximal deflection point may be substantially the same as the first and the second installation heights h1 and h2 of the first and the second end portion 101 and 102 because the body 110 of the bed structure 100 may be provided as a sufficient rigid body and the installation height of body 110 may be uniform in the first direction x when the bed structure 100 may be installed to the ground.

When the palette structure 200 including the standby workpiece SW may be positioned at the first end portion 101 of the bed structure 100 and the palette loading PL may be sufficiently large, a tensile deflection may be sufficiently applied to the maximal deflection point and the first bed height G1 of the body 110 may be higher than the original installation height. Thus, the difference between the first bed height G1 and the original installation height may be positive when the palette loading PL may be sufficiently large. In contrast, when the palette structure 200 without the standby workpiece SW may be positioned at the first end portion 101 of the bed structure 100 and the palette loading PL may be sufficiently small, a tensile deflection applied to the maximal deflection point may be negligible and the first bed height G1 of the body 110 may be smaller than the original installation height. Thus, the difference between the first bed height G1 and the original installation height may be positive when the palette loading may be sufficiently small.

Therefore, the palette sensor 531 may determine whether or not the palette loading PL may be sufficiently large or negligible just by the difference between the first bed height G1 and the original installation height of the bed structure 100.

When the palette loading PL may be negligible, the first bed height G1 may not have effect on the process for detecting the bed deformation and the installation errors of the table 400 and the spindle assembly 300. In contrast, when the palette loading PL may be sufficiently large, the first bed height G1 may have much effect on the process for detecting the bed deformation and the installation errors of the table 400 and the spindle assembly 300.

The deflection sensor 532 may detect the deflection or the deformation of the bed structure 100 at each point in the first direction x and the amount of the deflection at each point of the bed structure 100 may be expressed as the slant angle θ of each point. Particularly, the deflection sensor 532 may detect the deflection of the bed structure 100 in consideration of the palette loading PL and the load point of the table loading TL. The error generator 533 may generate the installation errors of the table 400 and the spindle assembly 300 from the deflection of the bed structure 100 (hereinafter, referred to as bed deflection).

For example, the deflection sensor 532 may detect the slant angle θ at the load points of the table loading TL and the spindle loading SL and an overall deflection of the bed structure 100 at the load points of the table loading TL and the spindle loading SL may be obtained by the slant angle θ.

For example, when the deflection curve of the bed structure 100 may be continuous in the first direction x and may be expressed as a single polynomial equation, the bed deflection may be obtained as an instantaneous slope of the continuous polynomial curve. Thus, the bed deflection due to the table loading TL and the spindle loading SL may be obtained as the instantaneous slope of the polynomial curve at the load points of the table loading TL and the spindle loading SL. In contrast, when the bed structure 100 may be divided into a plurality of bed sections separated by the maximal deflection point and the minimal deflection point and the deflection curve of the bed structure 100 may be discontinuous at every bed section and the deflection curve may be expressed as a linear equation in each bed section, the bed deflection may be obtained as a slope of each line corresponding to the linear equation in every bed section.

Particularly, when the deflection curve may be expressed as a line of the linear equation, the bed deflection due to the table loading TL and the spindle loading SL may be obtained from the slope of the line in the bed section in which the load points of the table loading TL and the spindle loading SL may be positioned. That is, when the deflection curve of the bed structure 100 may be expressed as the line in each bed section, no instantaneous slope at the load points may be required for obtaining the bed deflection since the slope of the line may be unique in every bed section. Accordingly, when the bed deflection due to the table loading TL and the spindle loading SL may be easily obtained just by selecting the bed section to which the table loading TL or the spindle loading SL may be applied.

For example, the slope of the line in the bed section may be calculated from a table horizontal distance, which may be a distance from the first end portion 101 to the maximal and minimal deflection point, and the first and the second bed heights G1 and G2 of the maximal and minimal deflection points. The bed deflection of the bed section may be calculated from the slope of the line in the bed section.

As the table 400 may move along the bed structure 100 in the first direction x, the load point of the table loading TL may also move in the first direction x and thus the load distribution applied to the bed structure 100 may be varied along the first direction x. However, the variation area of the load point of the table loading TL may be defined within the machining area of the machining center 1000, and the variation of the load point of the table loading TL within the machining area may have little effect on the bending moment due to the table loading TL. Accordingly, the deflection curve of the bed structure 100 may be substantially unchangeable irrespective of the load point variation of the table loading TL, and the slant angle θ detected by the deflection sensor 532 may be substantially unchanged irrespective of the table movement within the machining area of the machining center 1000.

The error generator 533 may generate the installation error α1 of the table 400 and the installation error α2 of the spindle assembly 300 from the bed deflection detected from the deflection sensor 532. Since the table 400 may move on the bed structure 100 in the first direction x and the load point of the table loading TL may be varied as the table movement, the bed deflection of the load point may also be varied and the installation error α1 of the table 400 may be varied according to the variation of the bed defection of the load point. In contrast, since the spindle assembly 300 may be secured to the second end portion 102 of the bed structure 100, the installation error α1 of the spindle assembly 300 may be determined by the bed deflection of the load point of the spindle loading SL. Therefore, the installation error α1 of the table 400 may be varied according to the load point of the table loading TL and the installation error α2 of the spindle assembly 300 may be uniquely determined when the deflection curve of the bed structure 100 may be obtained.

Hereinafter, the method of generating the installation error α1 of table 400 and the installation error α2 of the spindle assembly 300 may be described in detail in view of the palette loading PL and the variation of the process position of the table 400 in the first direction x.

Figure 2:
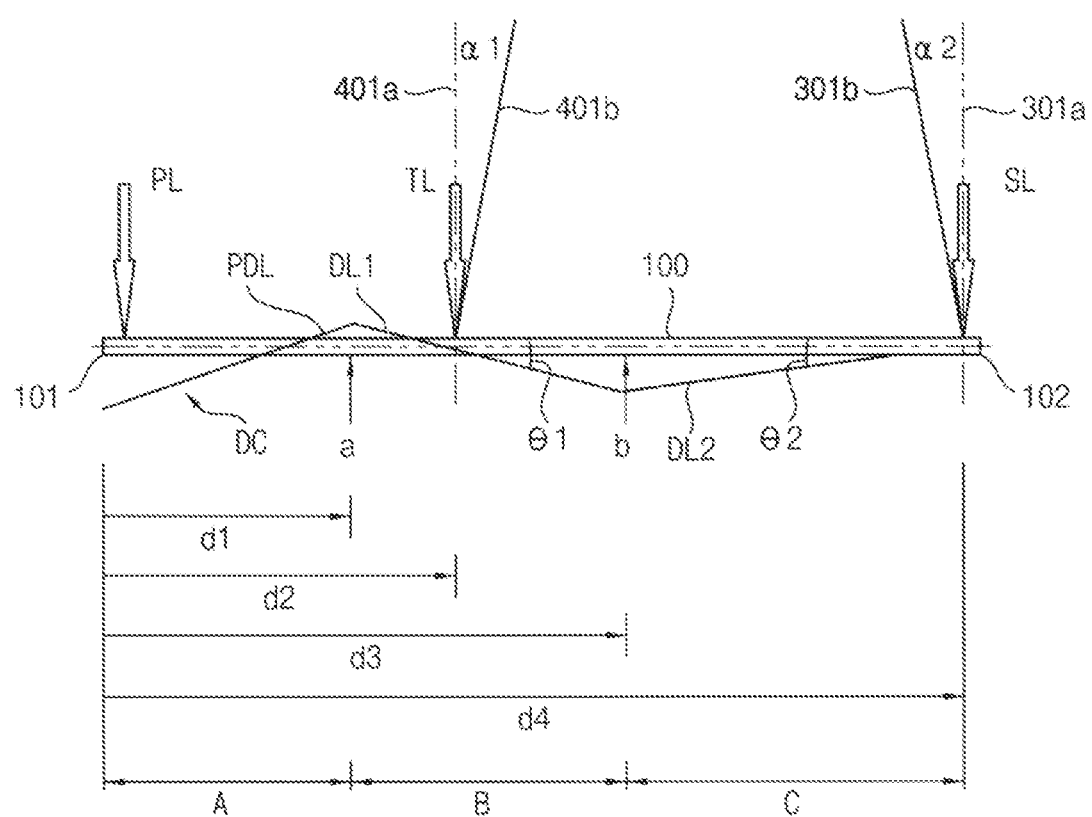
FIG. 2 is a view illustrating a free body diagram of the bed structure in which the palette loading is applied to a first end portion the table is positioned in the second bed section B and a deflection curve of the bed structure caused by the load distribution thereon.

FIG. 2 is a view illustrating a free body diagram of the bed structure in which the palette loading is applied to a first end portion the table is positioned in the second bed section B and a deflection curve of the bed structure caused by the load distribution thereon. Hereinafter, the coordinate value of the position on the bed structure 100 in the first direction x may be originated from the first end portion 101, so that the first end portion 101 may function as a starting point or an origin for the coordinate values of the bed structure position in the first direction x.

Referring to FIG. 2, the load distribution may be applied onto the bed structure 100 in such a way that the palette loading PL may be applied to the first end portion 101 of the bed structure, the table loading TL may be applied to the load point and the spindle loading SL may be applied to the second end portion 102 of the bed structure 100. Due to the load distribution onto the bed structure 100, the bed structure may be deformed approximately as shown by the deflection curve DC having the maximal deflection point a and the minimal deflection point b. Due to the distribution of the bending stress in the bed structure 100, a tensile deformation may be generated at the maximal deflection point and a compressive deformation may be generated at the minimal deflection point.

In the above load distribution, the maximal deflection point may be positioned at a coordinate value of d1 and the minimal deflection point b may be positioned at a coordinate value of d3. In addition, the load point of the table loading TL may be positioned at a coordinate value of d2 and the load point of the spindle loading SL may be positioned at a coordinate value of d4. The coordinate values d1 and d3 of the maximal and minimal deflection points a and b may be determined by a load analysis to the bed structure 100 such as the computer simulation and the coordinate value d2 of the load point of the table loading TL may be detected from the position detecting unit 510. In addition, the coordinate value d4 of the load point of the spindle loading SL may be provided as the installation specifications of the bed structure 100.

Therefore, the gap distance between the maximal deflection point a and the first end portion 101 may be substantially the same as d1 and, the gap distance between the load point of the table loading TL and the first end portion 101 may be substantially the same as d2. In addition, the gap distance between the minimal deflection point b and the first end portion 101 may be substantially the same as d3 and the gap distance between the load point of the spindle loading SL and the first end portion 101 may be substantially the same as d4. The first and the second bed heights G1 and G2 may be detected from the first detecting unit 511 at the maximal deflection point and the minimal deflection point, respectively.

The deformation of the bed structure 100 may be different by the maximal and minimal deflection points a and b. Thus, the bed structure 100 may be divided into a first bed section A between the first end portion 101 and the maximal deflection point a, a second bed section B between the maximal deflection point a and the minimal deflection point b and a third bed section C between the minimal deflection point b and the second end portion 102 of the bed structure 100. Then, the deflection curve DC may be provided as a line that may be obtained by a linear regression analysis in each of the bed sections A, B and C.

In the present example embodiment, the deflection curve DC may include a palette deflection line PDL having a slope upwards from left to right in the first bed section A, a first deflection line DL1 having a slope downwards from left to right in the second bed section B and a second deflection line DL2 having a slope upwards from left to right in the third bed section C.

Since the table 400 may move in the second and the third bed sections B and C and the spindle assembly 300 may be fixed at the second end portion 102 in the third bed section C, the installation errors of the table 400 and the spindle assembly 300 may be determined by the bed deflection of the second and the third bed sections B and C. The first and the second deflection lines DL1 and DL2 may have a constant slope in the second and the third bed sections B and C.

The slope of the first deflection line DL1 may be expressed as a first slant angle θ1 and the slope of the second deflection line DL2 may be expressed as a second slant angle θ2, as expressed by the following equations (1) and (2).

$$\theta_1 = \tan^{-1}\left(\frac{G_2 - G_1}{d_3 - d_1}\right) \tag{1}$$

$$\theta_2 = \tan^{-1}\left(\frac{h_2 - G_2}{d_4 - d_3}\right) \tag{2}$$

The coordinate values d1 and d3 of the maximal and the minimal deflection points a and b may be obtained by the load analysis of the bed structure 100 and the coordinate value d4 of the load point of the spindle loading SL and the second installation height h2 of the second end portion 102 may be provided as the installation specifications of the bed structure 100. In addition, the first and the second bed heights G1 and G2 may be detected from the position detecting unit 510 at the maximal and the minimal deflection points a and b. Therefore, the first and the second slant angles θ1 and θ2 may be eventually determined by the load distribution of the bed structure 100 and may be automatically detected from the deflection sensor 532.

Particularly, the first installation error α1 of the table 400 may be varied as the variation of the load point of the table loading TL in the first direction x.

Figure 3A:
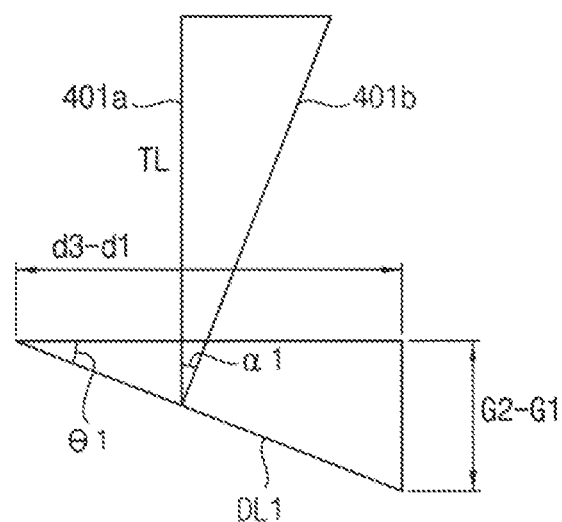
FIG. 3A is a view illustrating a geographical relation between the slope of the first deflection line and the first installation error of the table in case that the table is positioned in the second bed section shown FIG. 2.
Figure 3B:
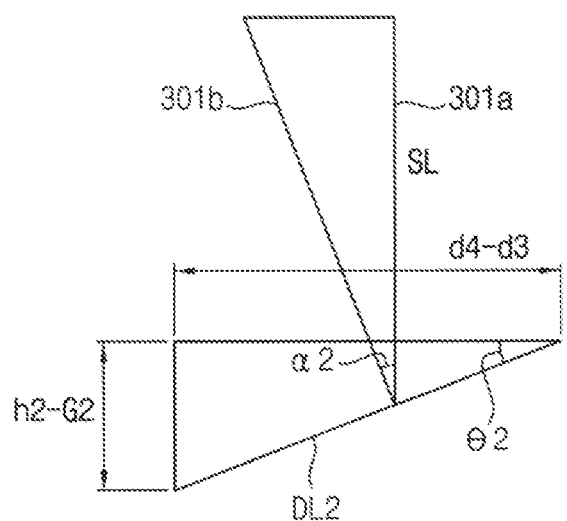
FIG. 3B is a view illustrating a geographical relation between the slope of the second deflection line and the second installation error of the spindle assembly in case that the table is positioned in the second bed section shown FIG. 2.

FIG. 3A is a view illustrating a geographical relation between the slope of the first deflection line and the first installation error of the table in case that the table is positioned in the second bed section shown FIG. 2. FIG. 3B is a view illustrating a geographical relation between the slope of the second deflection line and the second installation error of the spindle assembly in case that the table is positioned in the second bed section shown FIG. 2.

Referring to FIG. 3A, when the table 400 may be positioned in the second bed section B of the bed structure 100, the load point of the table loading TL may be varied in a range defined by the following equation (3).

$$d_2 < d_3 - l\cos\frac{\theta_1}{2} \qquad (3)$$

(wherein, the small letter 'l' denotes the length of the bed structure 100 in the first direction x).

In such a case, the table 400 positioned on the surface of the second bed section B may move along the first deflection line DL1, and as a result, the table 400 may also be deviated from the original installation position due to the first slant angle θ1 of the first deflection line DL1.

Thus, the installation state of the table 400 may be changed in such a way that the reference table axis 401a of the table 400 may be rotated clockwise as much as the first slant angle θ1 to a slant table axis 401b. The first installation error α1 for the table 400 may be measured by the installation deviation between the reference table axis 401a and the slant table axis 401b and may be substantially the same as the first slant angle θ1.

Therefore, when the load point of the table loading TL may be varied in a range defined by the following equation (3), the first installation error α1 may be detected as the following equation (4).

$$\alpha_1 = \tan^{-1}\left(\frac{G_2 - G_1}{d_3 - d_1}\right) \qquad (4)$$

Since the first installation error α1 may be substantially the same as the first slant angle θ1, the first installation error α1 may be eventually influenced by the load distribution of the bed structure 100 and may be automatically detected from the error generator 533.

In contrast, the spindle assembly 300 positioned on the surface of the third bed section C may move along the second deflection line DL2, and as a result, the spindle assembly 300 may also be deviated from the original installation position due to the second slant angle θ2 of the second deflection line DL2.

Thus, as shown in FIG. 3B, the installation state of the spindle assembly 300 may be changed in such a way that a reference column axis 301a of the transfer column 310 may be rotated counter clockwise as much as the second slant angle θ2 to a slant column axis 301b. The second installation error α2 for the spindle assembly 300 may be measured by the installation deviation between the reference column axis 301a and the slant column axis 301b and may be substantially the same as the second slant angle θ2.

Therefore, when the load point of the table TL may be varied in a range defined by the following equation (3), the second installation error α2 may be detected as the following equation (5).

$$\alpha_2 = \tan^{-1}\left(\frac{h_2 - G_2}{d_4 - d_3}\right) \qquad (5)$$

Since the second installation error α2 may be substantially the same as the second slant angle θ2, the second installation error α2 may be eventually influenced by the load distribution of the bed structure 100 and may be automatically detected from the error generator 533.

Accordingly, when the table 400 may be positioned in the second bed section B, the first installation error α1 for the table 400 and the second installation error α2 for the spindle assembly 300 may be obtained by the equations (4) and (5).

Particularly, when the table 400 may move ahead toward the third bed section C and may be positioned in the third bed section C, the first installation error α1 may be substantially the same as the second installation error α2.

Figure 4:
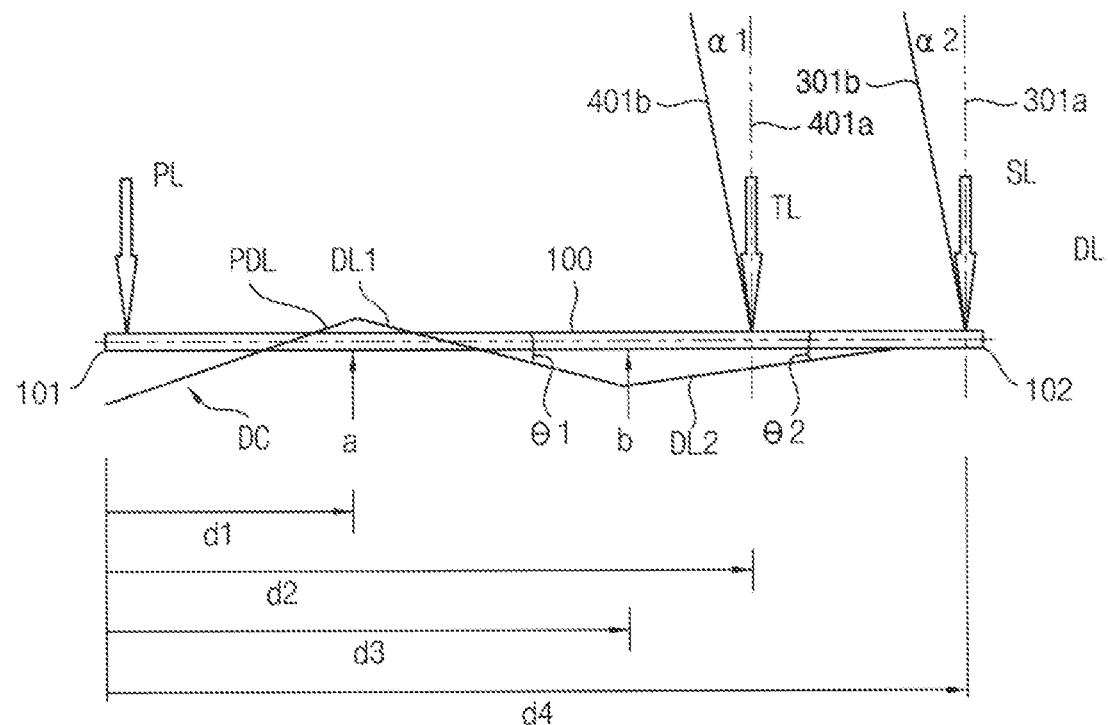
FIG. 4 is a view illustrating a free body diagram of the bed structure in which the palette loading is applied to a first end portion and the table is positioned in the third bed section C and a deflection curve of the bed structure caused by the load distribution thereon.
Figure 5:
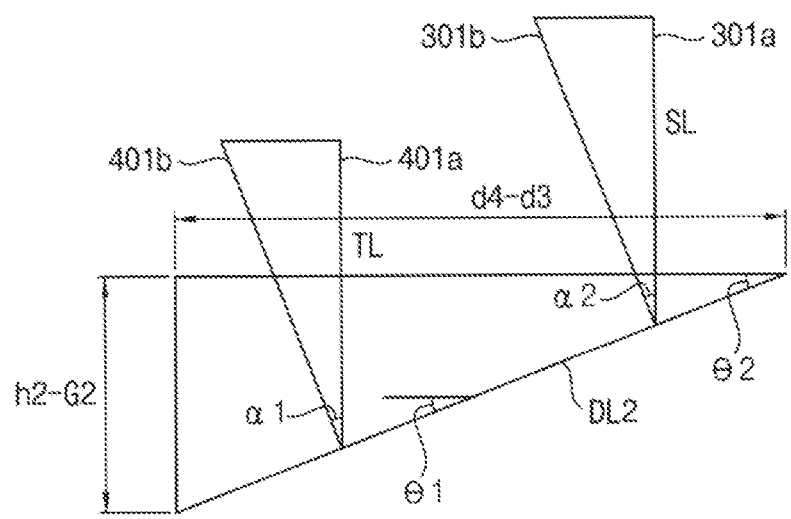
FIG. 5 is a view illustrating geographical relations between the slope of the first deflection line and the first installation error for the table and between the slope of the second deflection line and the second installation error for the spindle assembly in case that the table is positioned in the third bed section shown FIG. 2.

FIG. 4 is a view illustrating a free body diagram of the bed structure in which the palette loading is applied to a first end portion and the table is positioned in the third bed section C and a deflection curve of the bed structure caused by the load distribution thereon. FIG. 5 is a view illustrating geographical relations between the slope of the first deflection line and the first installation error for the table and between the slope of the second deflection line and the second installation error for the spindle assembly in case that the table is positioned in the third bed section shown FIG. 2.

Referring to FIGS. 4 and 5, when the table 400 may be positioned in the third bed section C of the bed structure 100, the load point of the table loading TL may be varied in a range defined by the following equation (6).

$$d_2 > d_3 + l\cos\frac{\theta_2}{2} \qquad (6)$$

(wherein, the small letter 'l' denotes the length of the bed structure 100 in the first direction x).

In such a case, the table 400 positioned on the surface of the third bed section C may move along the second deflection line DL2, and as a result, the table 400 may be deviated from the original installation position due to the second slant angle θ2 of the second deflection line DL2.

Thus, the installation state of the table 400 may be changed in such a way that the reference table axis 401a of the table 400 may be rotated counter clockwise as much as the second slant angle θ2 to the slant table axis 401b. The first installation error α1 for the table 400 may be measured by the installation deviation between the reference table axis 401a and the slant table axis 401b and may be substantially the same as the second slant angle θ2.

Therefore, when the load point of the table loading TL may be varied in a range defined by the following equation (6), the first installation error α1 may be detected as the following equation (7).

$$\alpha_1 = \tan^{-1}\left(\frac{h_2 - G_2}{d_4 - d_3}\right) \qquad (7)$$

Since the first installation error α1 for the table 400 may be substantially the same as the second slant angle θ2, the first installation error α1 may be eventually influenced by the load distribution of the bed structure 100 and may be automatically detected from the error generator 533.

In such a case, since the spindle assembly 300 may be fixed to the second end portion 102 in the third bed section C without any position variations, the spindle assembly 300 may also be positioned on the surface of the third bed section C and may move along the second deflection line DL2. Thus, the second installation error α2 for the spindle assembly 300 may also be detected by equation (7).

Accordingly, when the table 400 may be positioned in the third bed section C, the first installation error α1 for the table 400 and the second installation error α2 for the spindle assembly 300 may be obtained by equation (7).

Particularly, since both of the table 400 and the spindle assembly 300 may be deviated from the original installation points counter clockwise as much as the second slant angle θ2 in the third bed section C, the misalignment between the center of the machining workpiece MW and the central axis of the machining tool T may not occur in the machining center 1000. Therefore, when the table 400 may be positioned in the third bed section C, the first and the second installation errors α1 and α2 need not be detected by the error generator 533. Otherwise, although the first and the second installation errors α1 and α2 may be detected from the error generator 533, the error generator 533 may not generate a correction signal for correcting the first and the second installation errors α1 and α2, as will be described in detail hereinafter.

Figure 6:
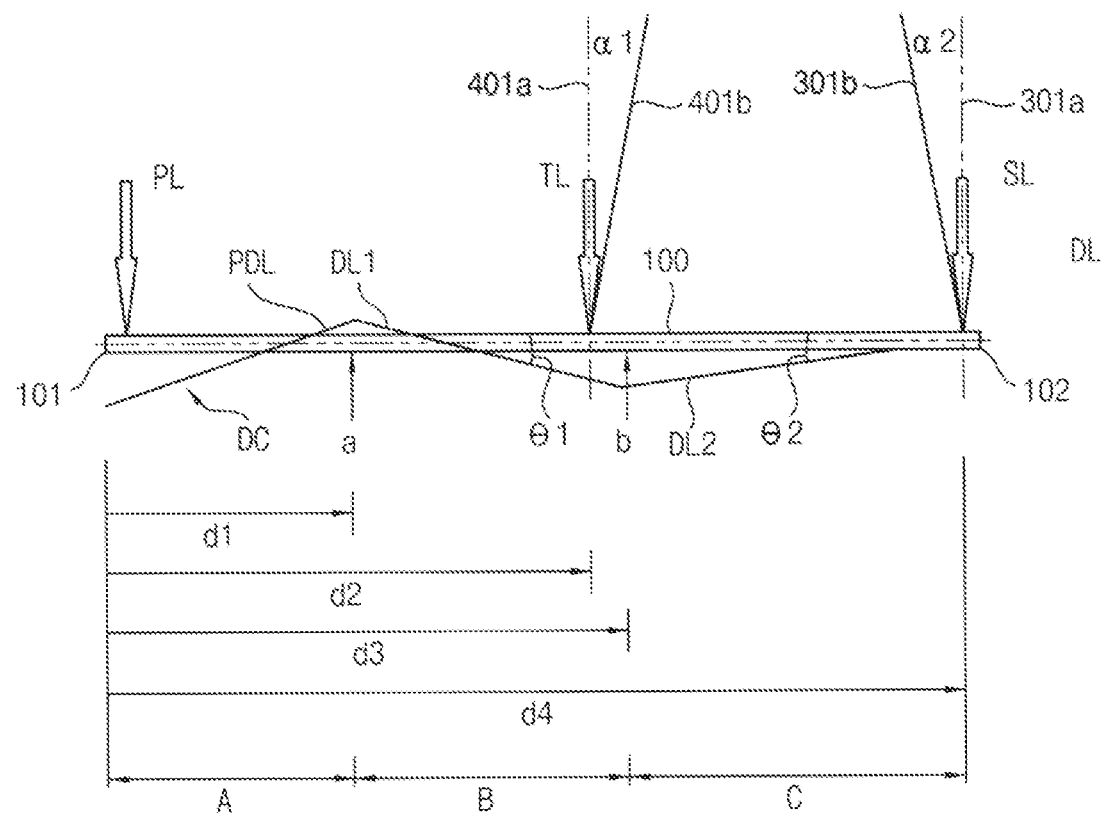
FIG. 6 is a view illustrating a free body diagram of the bed structure in which the palette loading is applied to a first end portion and the table is positioned across the second and third bed sections B and C and a deflection curve of the bed structure caused by the load distribution thereon.

FIG. 6 is a view illustrating a free body diagram of the bed structure in which the palette loading is applied to a first end portion and the table is positioned across the second and third bed sections B and C and a deflection curve of the bed structure caused by the load distribution thereon.

Referring to FIG. 6, when the table 400 may be positioned across the second and the third bed sections B and C of the bed structure 100, the load point of the table loading TL may be varied in a range defined by the following equation (8).

$$d_3 - l\cos\frac{\theta_1}{2} < d_2 < d_3 + l\cos\frac{\theta_2}{2} \quad (8)$$

(wherein, the small letter 'l' denotes the length of the bed structure 100 in the first direction x).

In such a case, the table 400 may be positioned on the surface of the second bed section B that may be deflected along the first deflection line DL1 and simultaneously positioned on the surface of the third bed section C that may be deflected along the second deflection line DL2, and as a result, the table 400 may be deviated from the original installation position due to contact configurations of the table 400 and the bed structure 100 as well as the first and the second slant angles θ1 and θ2.

Figure 7A:
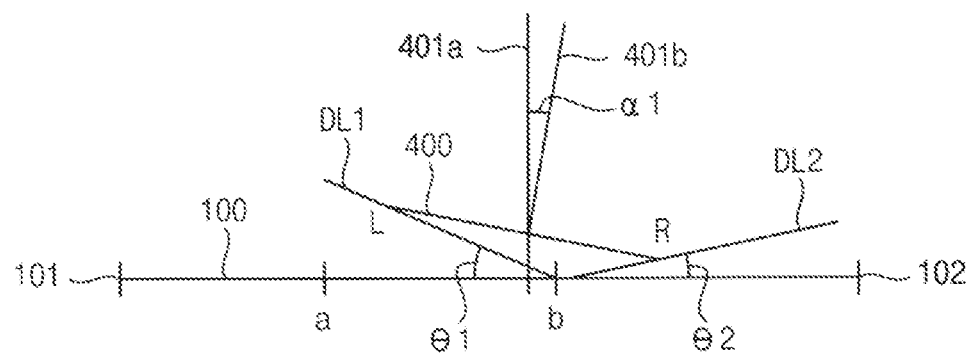
FIG. 7A is a view illustrating geographical relations between the slope of the first and the deflection lines and the first installation error for the table in case that the table is positioned in the second and the third bed sections shown FIG. 6.

FIG. 7A is a view illustrating geographical relations between the slope of the first and the deflection lines and the first installation error for the table in case that the table is positioned in the second and the third bed sections shown FIG. 6.

Referring to FIG. 7A, when a right end R of the table 400 may coincide with the minimal deflection point b, the table 400 may be positioned only in the second bed section B that may be deformed along the first deflection line DL1 and the table may be tilted clockwise as much as the first slant angle θ1. However, when the table 400 may move on the bed structure 100 toward the spindle assembly 300 and thus the right end R of the table 400 may move along the third bed section C that may be deformed along the second deflection line DL2, the right end R of the table 400 may also be tilted counter clockwise as much as the second slant angle θ2 while a left end L of the table 400 may still be positioned on the surface of the second bed section B that may be deformed along the first deflection line DL1. Therefore, the first installation error α1 may be gradually cancelled by the deformation of the third bed section C making contact with the right end R of the table 400 while the first installation α1 may be maintained by the deformation of the second bed section B making contact with the left end L of the table 400. As a result, the first installation error α1 of the table 400 may become smaller than the first slant angle θ1.

That is, the first installation error α1 may be varied according to the contact configurations between the table 400 and the bed structure 100 and to the second slant angle θ2 as well as the first slant angle θ1.

Figure 7B:
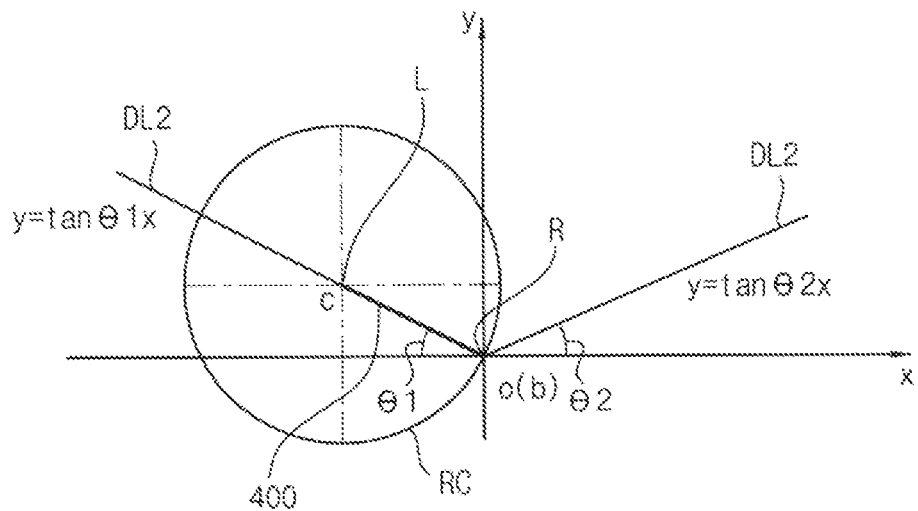
FIG. 7B is a view illustrating a geographical relation between the table and the first deflection line at the moment when the right end of the table passes the minimal deflection point b.
Figure 7C:
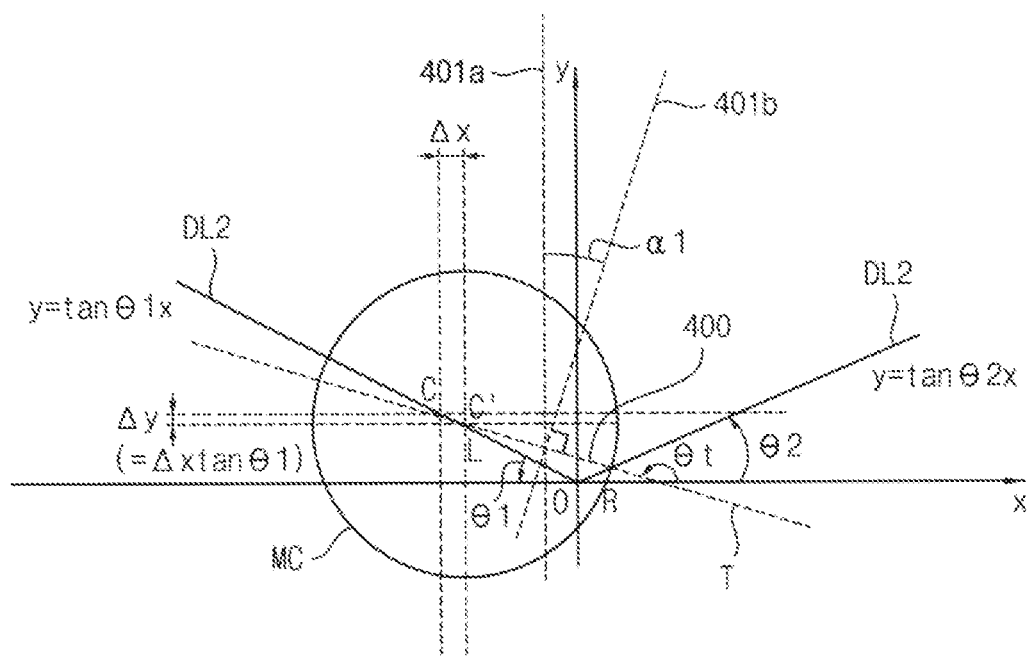
FIG. 7C is a view illustrating a geographical relation between the table and the first and the second deflection lines at the moment when the right end of the table has passed the minimal deflection point b and makes contact with the second deflection line.

FIG. 7B is a view illustrating a geographical relation between the table and the first deflection line at the moment when the right end of the table passes the minimal deflection point b, and FIG. 7C is a view illustrating a geographical relation between the table and the first and the second deflection lines at the moment when the right end of the table has passed the minimal deflection point b and makes contact with the second deflection line.

Referring to FIG. 7B, when a local coordinate system may be set on an x-y plane in such a way that the origin O of the local coordinate system may coincide with the minimal deflection point b at which the first and the second deflection lines DL1 and DL2 may be crossed with each other, the first deflection line DL1 and the second deflection line DL2 may be expressed as a linear function y=tan θ$_1$ and y=tan θ$_2$, respectively, in the local coordinate system.

When the right end R of the table 400 may coincide with the origin O of the local coordinate system and the whole table 400 may make contact with the first deflection line DL1, the left end L of the table 400 may be positioned at C(−l cos θ$_1$, l sin θ$_1$) in the local coordinate system.

When the table 400 may pass the origin O, i.e., the minimal deflection point b, and may move ahead along the second deflection line DL2 on the third bed section C, the table 400 may experience a composite motion having a linear translation and a rotation movement caused by the second slant angle θ2. A virtual reference circle RC may be provided around the table 400 in such a way that the center of the reference circle RC may be set as the position C of the left end L of the table 400 and the length 1 of the bed structure 100 may be set as a radius of the reference circle RC so as to analyze the composite motion of the table 400.

When the table 400 in the reference circle RC may move on the bed structure 100 toward the spindle assembly 300 with making contact with the bed structure 100, the left end L of the table 400 may move to a position C' from the center C of the reference circle RC along the first deflection line DL1 and the right end R of the table 400 may move toward the spindle assembly 300 along the second deflection line DL2.

Since the length 1 of the table 400 may be constant in the machining center 1000, a virtual moving circle MC may be provided around the table 400 in such a way that the center of the moving circle MC may be set as the position C' of the left end L of the table 400 and the length 1 of the bed structure 100 may be set as a radius of the moving circle MC.

Thus, the configuration of the table 400 across the first and the second deflection lines DL1 and DL2 may be represented as the movement of the reference circle RC to the moving circle MC in which the center position C of the reference circle RC may be shifted to the center position C' of the moving circle MC. That is, the movement of the table 400 passing the minimal deflection point may be substantially identical to the circle movement from the reference circle RC to the moving circle MC in the first direction x. Since the center positions C and C' may correspond to the left end L of the table 400, the movement of the reference circle RC to the moving circle MC may represent the movement of the table 400 in view of the displacement of the left end L of the table 400. The displacement of the left end L of the table 400 may be divided into a horizontal component Δx and a vertical component Δy. Since y=tan θ$_1$ in the local coordinate system, the vertical component Δy may be identical to Δx tan θ$_1$.

Since the coordinates of the center C' of the moving circle MC may be provided as (-l cos θ$_1$+Δx, l sin θ$_1$-Δx tan θ$_1$), the equation of the moving circle MC may be expressed as the following equation (9).

$$(x-(-l\cos\theta_1+\Delta x))^2+(y-(l\sin\theta_1-\Delta x\tan\theta_1))^2=l^2 \quad (9)$$

Since the second deflection line DL2 may be expressed as the linear function y=tan θ$_2$x, the right end R of the table 400 may be substantially identical to the cross point of the moving circle MC and the second deflection line DL2. Thus, the coordinates (Rx, Ry) of the right end R of the table 400 may be calculated from the linear function of the second deflection line DL2 and the equation (9) of the moving circle MC.

In such a case, the table 400 in the moving circle MC may be arranged in a table line T penetrating through the right end R and the left end L corresponding to the center C' of the moving circle MC. Therefore, the slope of the table line T may be provided as the following equation (10).

$$\theta_T = \tan^{-1}\left(\frac{R_y - (l\sin\theta_1 - \Delta x\tan\theta_1)}{R_x - (-l\cos\theta_1 + \Delta x)}\right) \quad (10)$$

As shown in FIG. 7C, the reference table axis 401a may be tilted clockwise by the first installation error α1 and may be formed into the slant table axis 401b and the first installation error α1 may be obtained from the following equation (11).

$$\alpha_1 = 180 - \theta_T \quad (11)$$

Therefore, the first installation error α1 may be uniquely determined by the coordinates (Rx, Ry) of the right end R of the table 400 and the first and the second slant angles θ1 and θ2. Particularly, when the load distribution to the bed structure 100 may be specified and as a result, the first and the second slant angles θ1 and θ2 may be specified, the first installation error α1 may be expressed as a function of the moving distance Δx of the table 400 from the second bed section B to the third bed section C.

In the present example embodiment, the table line T may pass a left contact point at which the left end L of the table 400 may make contact with the bed structure 100 deflected along the first deflection line DL1 and a right contact point at which the right end R of the table 400 may make contact with the bed structure 100 deflected along the second deflection line DL2, and the error generator 533 may detect the first installation error α1 as a supplementary angle of the slope θ$_T$ of the table line T.

Particularly, the coordinates (Rx, Ry) of the right end R of the table 400 may be calculated as the following equations (11) and (12).

$$R_x = A\Delta x + B + \frac{1}{2}\sqrt{C\Delta x^2 + D\Delta x + E} \quad (12)$$

$$R_x = A\Delta x + B + \frac{1}{2}\sqrt{C\Delta x^2 + D\Delta x + E} \quad (13)$$

(wherein, A=-2 cos$^2$ θ$_1$(tan θ$_1$ tan θ$_2$-1), B=-2 cos$^2$ θ$_1$(l cos θ$_1$-l sin θ$_1$ tan θ$_2$)

$$C = -3 - 2\tan\theta_1\tan\theta_2 + \tan^2\theta_1\tan^2\theta_2,$$

D=2l(-cos θ$_1$+sin θ$_1$ tan θ$_2$+cos θ$_1$ tan θ$_1$ tan θ$_2$-sin θ$_1$ tan θ$_1$ tan$^2$θ$_2$+4 sin$^2$θ$_1$ cos θ$_1$)

E=l(l cos θ$_1$-2l sin θ$_1$ cos θ$_1$ tan θ$_2$+l sin$^2$θ$_1$ tan$^2$θ$_2$+8 cos$^3$θ$_1$).

Based on the above, the first installation error α1 may be obtained by the following equation (14).

$$\alpha_1 = \tan^{-1}\left(\frac{\tan\theta_2(Ad+B)+\frac{1}{2}\tan\theta_2\sqrt{Cd^2+Dd+E}-}{Ad+B+\frac{1}{2}\sqrt{Cd^2+Dd+E}+}\right) - 90 \quad (14)$$

$$\frac{l\sin\theta_1+d\tan\theta_1}{l\cos\theta_1-d}$$

Sine the spindle assembly 300 may still be fixed to the second end portion 102 of the bed structure 100 while the table 400 may move to be across the first and the second deflection lines DL1 and DL2, the second installation error α2 may only be determined by the second deflection line DL2 and may be substantially the same as the second slant angle θ2.

Therefore, the second installation error α2 may be obtained from the following equation (15).

$$\alpha_2 = \tan^{-1}\left(\frac{h_2 - G_2}{d_4 - d_3}\right) \quad (15)$$

Accordingly, when the palette loading PL may be applied to the first end portion 101 and the table 400 may be positioned across the second bed section B and the third bed section C, the first and the second installation errors α1 and α2 may be obtained from the error generator 533 by using the above equation (14) and (15).

Figure 8:
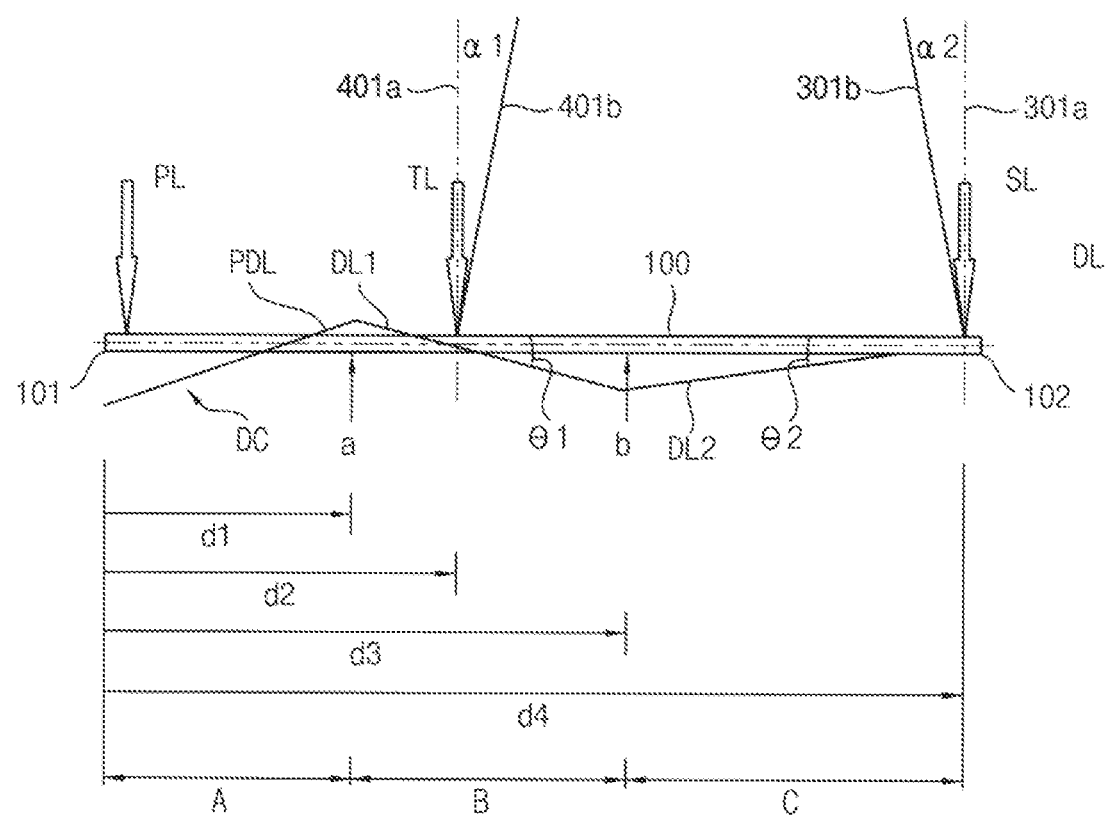
FIG. 8 is a view illustrating a free body diagram of the bed structure in which no palette loading is applied to the first end portion and the table is positioned in the second bed section B and a deflection curve of the bed structure caused by the load distribution thereon.

FIG. 8 is a view illustrating a free body diagram of the bed structure in which no palette loading is applied to the first end portion and the table is positioned in the second bed section B and a deflection curve of the bed structure caused by the load distribution thereon.

Referring to FIG. 8, the palette loading PL may be negligible and the table loading TL and the spindle loading SL may only be applied to the bed structure 100, and the bed structure 100 may be deflected in such a way that only the minimal deflection point b may occur without the maximal deflection point.

In the above load distribution, the minimal deflection point b may be positioned at a coordinate value of d3, and the load point of the table loading TL may be positioned at a coordinate value of d2. The load point of the spindle loading SL may be positioned at a coordinate value of d4. Therefore, the gap distance between the load point of the table loading TL and the first end portion 101 may be expressed as d2, and the gap distance between the minimal deflection point b and the first end portion 101 may be expressed as d3. In the same way, the gap distance between the load point of the spindle loading SL and the first end portion 101 may be expressed as d4. The second bed height G2 may be detected at the minimal deflection point by the first detecting unit 511. Since the maximal deflection point may not be provided with the bed structure 100, the second bed height G2 may be referred to as the bed height G hereinafter.

Due to the above load distribution shown in FIG. 8, the deformation of the bed structure 100 may be varied at the minimal deflection point b. Thus, the bed structure 100 may be divided into a first bed section A between the first end portion 101 and the minimal deflection point b and a second bed section B between the minimal deflection point b and the second end portion 102 of the bed structure 100. Then, the deflection curve DC may be provided as a line that may be obtained by a linear regression analysis in each of the first and the second bed sections A and B.

In the present example embodiment, the deflection curve DC may include a first deflection line DL1 having a slope downwards from left to right in the first bed section A and a second deflection line DL2 having a slope upwards from left to right in the second bed section B.

Since the table 400 may move in the first and the second bed sections A and B and the spindle assembly 300 may be fixed at the second end portion 102 in the second bed section B, the installation errors α1 and α2 of the table 400 and the spindle assembly 300 may be determined by the bed deflection of the first and the second bed sections A and B. The amount of the first and the second bed sections A and B may be expressed as the slope of the first and the second deflection lines DL1 and DL2, respectively.

The slope of the first deflection line DL1 may be expressed as a first slope angle θ1 by the following equation (16) and the slope of the second deflection line DL2 may be expressed as a second slope angle θ2 by the following equation (17).

$$\theta_1 = \tan^{-1}\left(\frac{h_1 - G}{d_3}\right) \tag{16}$$

$$\theta_2 = \tan^{-1}\left(\frac{h_2 - G}{d_4 - d_3}\right) \tag{17}$$

In the above equations (16) and (17), the coordinate value d3 of the minimal deflection point b may be obtained by the load analysis of the bed structure 100 and the coordinate value d4 of the load point of the spindle loading SL and the second installation height h2 of the second end portion 102 may be provided as the installation specifications of the bed structure 100. In addition, the bed height G may be detected from the position detecting unit 510 at the minimal deflection point b. Therefore, the first and the second slant angles θ1 and θ2 may be eventually determined by the load distribution of the bed structure 100 and may be automatically detected from the deflection sensor 532.

In the above load distribution and bed deflection, the first installation error α1 of the table 400 may be varied as the variation of the load point of the table loading TL in the first direction x.

Figure 9:
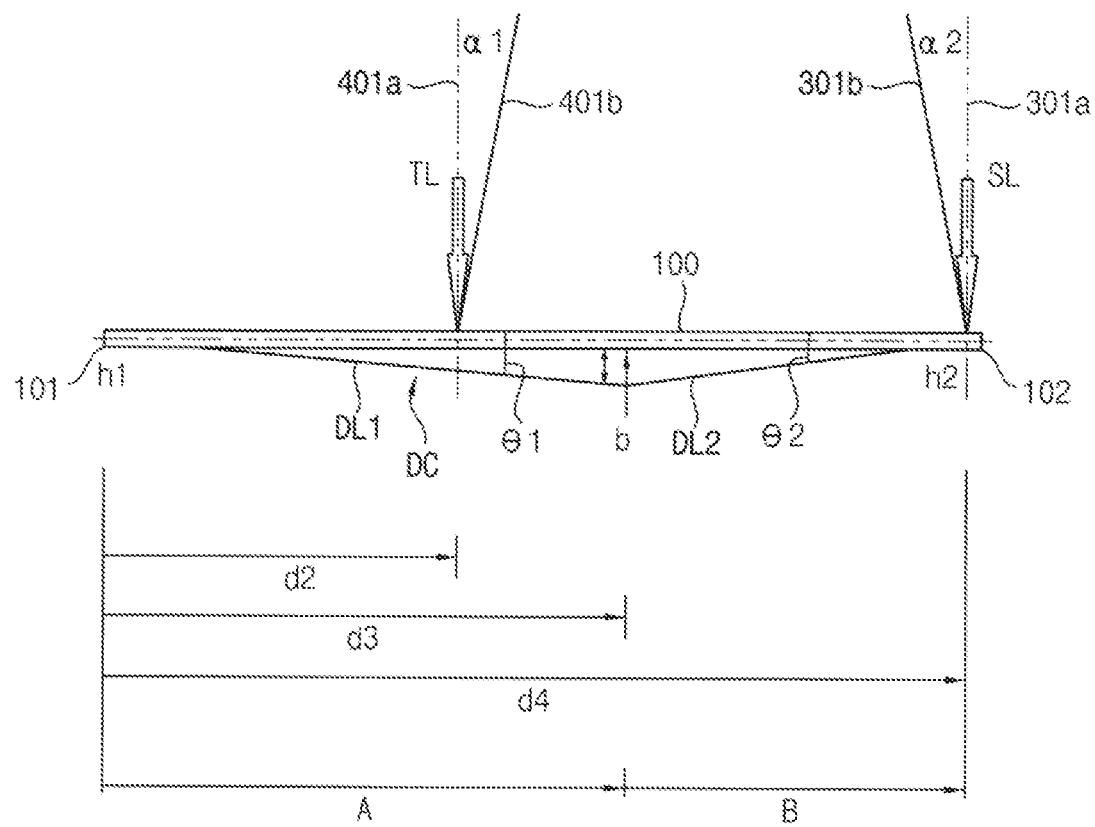
FIG. 9 is a view illustrating a geographical relation between the slope of the first deflection line of the bed structure and the first installation error of the table in case that the table is positioned in the first bed section shown FIG. 8.

FIG. 9 is a view illustrating a geographical relation between the slope of the first deflection line of the bed structure and the first installation error of the table in case that the table is positioned in the first bed section shown FIG. 8.

Referring to FIG. 9, when the table 400 may be positioned in the first bed section A of the bed structure 100, the load point of the table loading TL may be varied in a range defined by the following equation (18).

$$d_2 < d_3 - l\cos\frac{\theta_1}{2} \tag{18}$$

(wherein, the small letter 'l' denotes the length of the bed structure 100 in the first direction x).

In such a case, the table 400 may be positioned on the surface of the first bed section A and may move along the first deflection line DL1, and as a result, the table 400 may be deviated from the original installation position due to the first slant angle θ1 of the first deflection line DL1.

Thus, the installation state of the table 400 may be changed into a slant table axis 401b in such a way that the reference table axis 401a of the table 400 may be rotated clockwise as much as the first slant angle θ1. The first installation error α1 for the table 400 may be measured by the installation deviation between the reference table axis 401a and the slant table axis 401b and may be substantially the same as the first slant angle θ1, i.e., the slope of the first deflection line DL1.

Therefore, when the load point of the table loading TL may be varied in a range defined by the following equation (18), the first installation error α1 may be detected by the following equation (4).

$$\alpha_1 = \tan^{-1}\left(\frac{h_1 - G}{d_3}\right) \tag{19}$$

Since the first installation error α1 may be substantially the same as the first slant angle θ1, the first installation error α1 may be eventually influenced by the load distribution of the bed structure 100 and may be automatically detected from the error generator 533.

In contrast, the spindle assembly 300 may be positioned on the surface of the second bed section B and may move along the second deflection line DL2, and as a result, the spindle assembly 300 may be deviated from the original installation position due to the second slant angle θ2 of the second deflection line DL2.

Thus, the installation state of the spindle assembly 300 may be changed in such a way that a reference column axis 301a of the transfer column 310 may be rotated counter clockwise as much as the second slant angle θ2 and the reference column axis 301a may be transferred to a slant column axis 301b. The second installation error α2 for the spindle assembly 300 may be measured by the installation deviation between the reference column axis 301a and the slant column axis 301b and may be substantially the same as the second slant angle θ2.

Therefore, when the load point of the table TL may be varied in a range defined by the following equation (3), the second installation error α2 may be detected as the following equation (20).

$$\alpha_2 = \tan^{-1}\left(\frac{h_2 - G}{d_4 - d_3}\right) \tag{20}$$

Since the second installation error α2 may be substantially the same as the second slant angle θ2, the second installation error α2 may be eventually influenced by the load distribution of the bed structure 100 and may be automatically detected from the error generator 533.

Accordingly, when the table 400 may be positioned in the first bed section A, the first installation error α1 for the table 400 and the second installation error α2 for the spindle assembly 300 may be obtained by the equations (19) and (20), respectively.

Although not shown in figures, when the table 400 may move ahead toward the spindle assembly 300 and may be positioned in the second bed section B, the first installation error α1 may be substantially the same as the second installation error α2 as described in detail with reference to FIG. 5.

When the table 400 may be positioned in the second bed section B of the bed structure 100, the load point of the table loading TL may be varied in a range defined by the following equation (21).

$$d_2 > d_3 + l\cos\frac{\theta_2}{2} \tag{21}$$

(wherein, the small letter '1' denotes the length of the bed structure 100 in the first direction x).

In such a case, the table 400 positioned may be positioned on the surface of the second bed section B and may move along the second deflection line DL2, and as a result, the table 400 may be deviated from the original installation position due to the second slant angle θ2 of the second deflection line DL2.

Thus, the installation state of the table 400 may be changed into the slant table axis 401b in such a way that the reference table axis 401a of the table 400 may be rotated counter clockwise as much as the second slant angle θ2. The first installation error α1 for the table 400 may be measured by the installation deviation between the reference table axis 401a and the slant table axis 401b and may be substantially the same as the second slant angle θ2.

In addition, since the spindle assembly 300 may be fixed to the second end portion 102 in the second bed section B without any position variations, the spindle assembly 300 may also be positioned on the surface of the second bed section B and may move along the second deflection line DL2. Thus, the second installation error α2 for the spindle assembly 300 may be substantially the same as the second slant angle θ2 of the second deflection line DL2. Thus, the installation state of the spindle assembly 300 may be changed in such a way that the reference column axis 301a of the transfer column 310 may be rotated counter clockwise as much as the second slant angle θ2 and the reference column axis 301a may be transferred to the slant column axis 301b. The second installation error α2 for the spindle assembly 300 may be measured by the installation deviation between the reference column axis 301a and the slant column axis 301b and may be substantially the same as the second slant angle θ2.

Therefore, when the load point of the table loading TL may be varied in a range defined by the following equation (21), the first installation error α1 and the second installation error α2 may be substantially identical to each other and may be detected by the following equation (22).

$$\alpha_1 = \alpha_2 = \tan^{-1}\left(\frac{h_2 - G}{d_4 - d_3}\right) \tag{22}$$

Since the first installation error α1 for the table 400 may be substantially the same as the second slant angle θ2, the first installation error α1 may be eventually influenced by the load distribution of the bed structure 100 and may be automatically detected from the error generator 533.

Particularly, since both of the table 400 and the spindle assembly 300 may be deviated from the original installation points counter clockwise as much as the second slant angle θ2 in the second bed section B, the misalignment between the center of the machining workpiece MW and the central axis of the machining tool T may not occur in the machining center 1000 in spite of the installation errors α1 and α2. Therefore, when the table 400 may be positioned in the second bed section B, the first and the second installation errors α1 and α2 need not be detected by the error generator 533. Otherwise, although the first and the second installation errors α1 and α2 may be detected from the error generator 533, the error generator 533 may not generate a correction signal for correcting the first and the second installation errors α1 and α2.

Further, the table 400 may be positioned across the first and the second bed sections A and B of the bed structure 100. In such a case, the load point of the table loading TL may be varied in a range defined by the following equation (23).

$$d_3 - l\cos\frac{\theta_1}{2} < d_2 < d_3 + l\cos\frac{\theta_2}{2} \tag{23}$$

(wherein, the small letter '1' denotes the length of the bed structure 100 in the first direction x).

In such a case, the table 400 may be positioned on the surface of the first bed section A that may be deflected along the first deflection line DL1 and simultaneously positioned on the surface of the second bed section B that may be deflected along the second deflection line DL2, and as a result, the table 400 may be deviated from the original installation position due to contact configurations of the table 400 and the bed structure 100 as well as the first and the second slant angles θ1 and θ2.

In the same way as described in detail with reference to FIGS. 7A to 7C, when the load point of the table loading TL may be varied in a range defined by the following equation (23), the table 400 may be positioned along a table line T and the slope θ$_T$ of the table line T may be obtained by the equation (10). The table line T may connect the right end R of the table 400 making contact with the second deflection line DL2 and the left end L of the table 400 making contact with the first deflection line DLL When the slope θ$_T$ of table line T may be obtained, the first installation error α1 may be detected by equation (11).

Therefore, the first installation error α1 may be uniquely determined by the coordinates (Rx, Ry) of the right end R of the table 400 and the first and the second slant angles θ1 and θ2. Particularly, when the load distribution to the bed structure 100 may be specified and as a result, the first and the second slant angles θ1 and 02 may also be specified, the first installation error α1 may be expressed as a function of the moving distance Δx of the table 400 from the first bed section A to the second bed section B.

The bed deflection of the bed structure 100 and the installation errors of the table 400 and the spindle assembly 300 may be varied according the palette loading PL and the load point of the table loading TL. That is, the error calculating unit 530 may detect the bed deflection and the installation errors in view of the palette loading PL and the load point of the table loading TL.

The storing unit 540 may store the installation specifications of the machining center 1000. For example, the configurations and the installation specifications of the bed structure 100 may be stored in the storing unit 540 as a digital data. While the present example embodiment discloses that the first and the second installation heights h1 and h2 may be detected by the position sensor in the bed support 120, the first and the second installation heights h1 and h2 may also be obtained from the installation specifications of the bed structure 100 that may be stored in a storing unit 540. The deflection sensor 532 and the error generator 533 may automatically refer to the digital data of the installation specifications of the bed structure 100, if necessarily.

Particularly, in case that the maximal and minimal deflection points a and b may be determined by the load distribution to the bed structure 100, the coordinates of d1, d2, d3 and d4 may be constant until the load distribution may be changed. Thus, once the load distribution may be specified to the bed structure 100, the coordinates of d1, d2, d3 and d4 may also be stored in the storing unit 540 and may be selectively transferred to the deflection sensor 532 and the error generator 533.

The driving unit 550 may drive the table 400 and/or the spindle assembly 300 and may correct the installation errors $\alpha 1$ and $\alpha 2$ of the table 400 and the spindle assembly 300.

Figure 10:
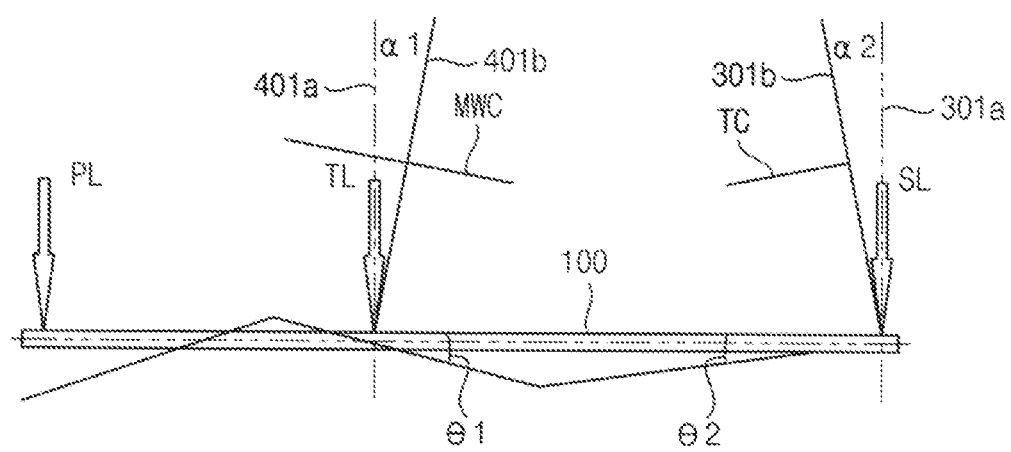
FIG. 10 is a view illustrating a misalignment between the machining workpiece and the machining tool on the bed structure to which the load distribution shown in FIG. 2 is applied.

FIG. 10 is a view illustrating a misalignment between the machining workpiece and the machining tool on the bed structure to which the load distribution shown in FIG. 2 is applied.

Referring to FIG. 10, when the machining workpiece MW may be positioned on the bed structure 100 at an initial time, no deflection or deformation may occur to the bed structure 100 and a central line MWC of the machining workpiece MW may be substantially perpendicular to the reference table axis 401a of the table 400. In addition, the machining tool T may be secured to the spindle head 320 in such a way that the central axis of the machining tool T may be substantially perpendicular to the transfer column 310 and may be in parallel with the upper surface of the bed structure 100. Thus, the central line MWC of the machining workpiece MW may be automatically aligned with the central line TC of the tool T over the bed structure 100.

Then, as the bed structure 100 may be deflected along the deflection line DL by the load distribution thereon, the central line MWC of the machining workpiece MW may be tilted clockwise as much as the first installation error $\alpha 1$ and the central line of the tool T may be also tilted counter clockwise as much as the second installation error $\alpha 2$. Thus, the machining workpiece MW may be misaligned with the machining tool T due to the bed deflection.

When the first and the second installation errors $\alpha 1$ and $\alpha 2$ may be detected by the deflection sensor 532, the error generator 533 may generate a correction signal for correcting the first and the second installation errors $\alpha 1$ and $\alpha 2$ and may transfer the correction signal to the driving unit 550. the driving unit 550 may drive at least one of the table 400 and the spindle assembly 300 in such a way that the central line of the machining workpiece MW may be aligned again with the central line TC of the machining tool T.

In the present example embodiment, the driving unit 550 may include a table driver 551 for rotating the table 400 at a first correction angle w1 with respect to the third direction z and a spindle driver 552 for rotating the spindle head 320 at a second correction angle w12 with respect to the third direction z.

For example, the table driver 551 and the spindle driver 552 may be operated complementary to each other. Thus, when the table driver 551 may be activated, the spindle driver 552 may be inactivated and the table 400 may be rotated as much as the summation of the first and the second installation errors $\alpha 1$ and $\alpha 2$. In contrast, when the spindle driver 552 may be activated, the table driver 551 may be inactivated and the spindle head 320 may be rotated as much as the summation of the first and the second installation errors $\alpha 1$ and $\alpha 2$. Therefore, one of the machining workpiece MW and the machining tool T may be rotated for aligning with the other thereof.

Figure 11A:
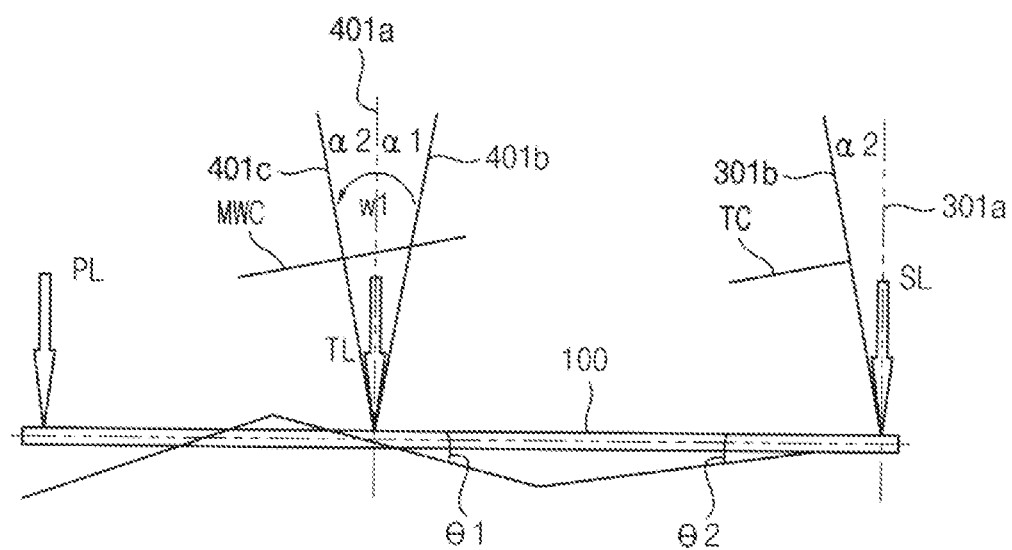
FIG. 11A is a view illustrating a correction of the misalignment between the machining workpiece and the machining tool shown in FIG. 9 by correcting the installation error of the table.

FIG. 11A is a view illustrating a correction of the misalignment between the machining workpiece and the machining tool shown in FIG. 10 by correcting the installation error of the table.

Referring to FIG. 11A, while the spindle assembly 300 may still be tilted by the second installation error $\alpha 2$, the first installation error $\alpha 1$ may be corrected by the table driver 551 in such a way that the table 400 and the spindle assembly 300 may have substantially the same tilting configurations. Thus, the machining workpiece MW may be controlled to align with the machining tool T.

For example, the table driver 551 may drive the table 400 to rotate counter clockwise at an angle of the first and the second installation errors $\alpha 1$ and $\alpha 2$ for making the central line MWC of the machining workpiece MW be in parallel with the central line TC of the machining tool T. At first, the table 400 may be rotated counter clockwise at an angle of the first installation error $\alpha 1$ in such a way that the slant table axis 401b may be restored to the reference table axis 401a. Then, the table 400 may be further rotated counter clockwise at an angle of the second installation error $\alpha 2$ in such a way that the restored reference table axis 401a may be tilted again to an opposite side as another slant table axis 401c. When the central axis of the table 400 may be changed from the slant table axis 401b to another slant table axis 401c, the central line MWC of the machining workpiece MW may be aligned with the central line TC of the tool T since the central axis of the column 310 may still keep on tilting at an angle of the second installation error $\alpha 2$. That is, the central line MWC of the machining workpiece MW may extend upwards from left to right just like the central line of the machining tool T in such a way that the machining workpiece MW may be aligned with the machining tool T.

Accordingly, the correction angle w1 of the table 400 may be calculated as the following equation (24).

$$w_1 = \alpha_1 + \alpha_2 \tag{24}$$

Figure 11B:
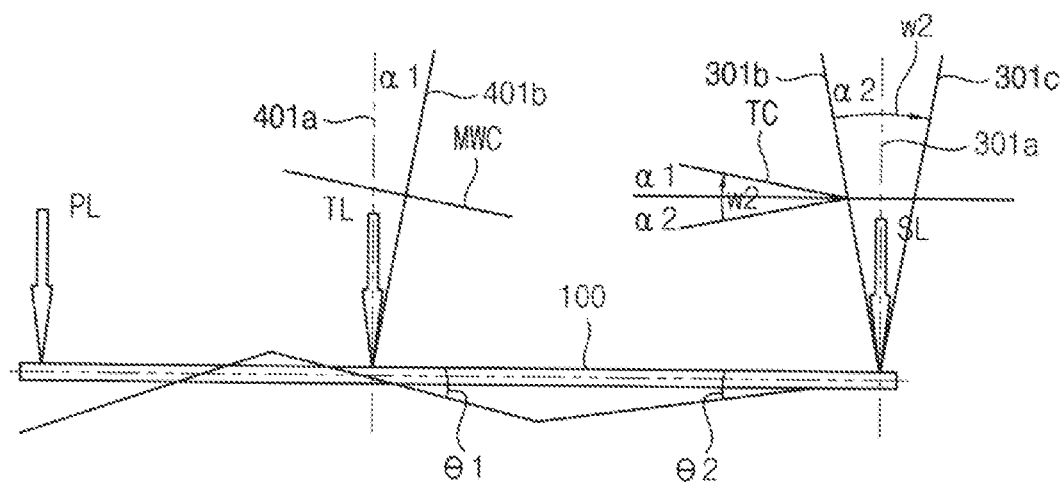
FIG. 11B is a view illustrating a correction of the misalignment between the machining workpiece and the machining tool shown in FIG. 9 by correcting the installation error of the spindle assembly.

FIG. 11B is a view illustrating a correction of the misalignment between the machining workpiece and the machining tool shown in FIG. 9 by correcting the installation error of the spindle assembly.

Referring to FIG. 11B, while the table 400 may still be tilted by the first installation error $\alpha 1$, the second installation error $\alpha 2$ may be corrected by the spindle driver 552 in such a way that the table 400 and the spindle assembly 300 may have substantially the same tilting configurations. Thus, the machining tool T may be controlled to align with the machining workpiece MW.

For example, the spindle driver 552 may drive the spindle assembly 300 to rotate clockwise at an angle of the first and the second installation errors $\alpha 1$ and $\alpha 2$ for making the central line TC of the machining tool T be in parallel with the central axis MWC of the machining workpiece MW. At first, the transfer column 310 of the spindle assembly 300 may be rotated clockwise at an angle of the second installation error $\alpha 2$ in such a way that the slant column axis 301b may be restored to the reference column axis 301a. Then, the transfer column 310 may be further rotated clockwise at an angle of the first installation error $\alpha 1$ in such a way that the restored reference column axis 301a may be tilted again to an opposite side as another slant column axis 301c. When the central axis of the spindle assembly 300 may be changed from the slant column axis 301b to another slant column axis

301c, the central line TC of the machining tool T may be aligned with the central line MWC of the machining workpiece MW since the central axis of the table 400 may still keep on tilting at an angle of the first installation error α1. That is, the central line TC of the machining tool T may extend downwards from left to right just like the central line MWC of the machining workpiece MW in such a way that the machining workpiece MW may be aligned with the machining tool T.

Accordingly, the correction angle w2 of the spindle assembly 300 may also be calculated as the following equation (25).

$$w_2 = \alpha_1 + \alpha_2 \quad (25)$$

Although not shown in figures, both of the table 400 and the spindle assembly 300 may simultaneously be corrected for aligning the machining workpiece MW and the machining tool T. The table 400 may be rotated counter clockwise at an angle of the first installation error α1 in such a way that the slant table axis 401b may be restored to the reference table axis 401a and the spindle assembly 300 may be rotated clockwise at an angle of the second installation error α2 in such a way that the slant column axis 301b may be restored to the reference column axis 301a. In such a case, the first correction angle w1 of the table 400 may be substantially identical to the first installation error α1 and the second correction angle w2 of the spindle assembly 300 may be substantially identical to the second installation error α2.

While the present example embodiment discloses that the first and the second slant angles θ1 and θ2 and the first and the second installation errors α1 and α2 may be obtained from the discrete deflection lines, which may be obtained by a linear regression analysis in each of the bed sections, the first and the second slant angles θ1 and θ2 and the first and the second installation errors α1 and α2 may also be obtained from a continuous deflection curve that may be obtained by a computer simulation along a whole length of the bed structure 100.

For example, the computer simulation may be conducted based on the first and the second installation heights h1 and h2 and the load distribution to the bed structure 100, thereby obtaining a polynomial deflection curve on the whole length of the bed structure 100. Then, instantaneous slopes may be calculated from the polynomial deflection curve at the load points of the table loading TL and the spindle loadings SL, thereby obtaining the first and the second slant angles θ1 and θ2. Then, the first and the second installation errors α1 and α2 may be obtained from the first and the second slant angles θ1 and θ2.

Therefore, the automatic aligner 500 may detect the load point of the table loading TL and whether or not the palette lading PL may be applied to the bed structure 100 and then may detect the first and the second slant angles θ1 and θ2 of the deflection line or curve of the bed structure 100. Then, the automatic aligner 500 may obtain the first and the second installation errors α1 and α2 from the first and the second slant angles θ1 and θ2 and finally may correct the first and the second installation errors α1 and α2 by driving at least one of the table 400 and the spindle assembly 300. in such a way that the central line MWC of the machining workpiece MW may be aligned with the central line TC of the machining tool T.

INDUSTRIAL APPLICATION

According to the example embodiments of the machining center, the load distribution to the bed structure and the load point of the table loading may be automatically detected and the deflection curve of the bed structure may be generated based on the load distribution and the load point of the table loading. Then, the bed deflections and the installation errors may be automatically obtained from the deflection curve, and at least one of the table and the spindle assembly may be automatically rotated for aligning the machining workpiece and the machining tool. Therefore, the misalignment between the machining workpiece and the machining tool may be automatically detected and corrected in the machining center, thereby increasing the machining precision of the machining center.

While the present example embodiment discloses the correction of the misalignment between the machining workpiece and the machining tool in the horizontal machining center, the present inventive misalignment correction may also be applied to any other machining systems such as a vertical machining tool as long as the misalignment between the machining workpiece and the machining tool may be caused by the bed deflection.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A machining center comprising:
   a bed structure deflected in a longitudinal direction along a deflection curve by a load distribution thereon and having a pair of position sensors detecting bed heights at a minimal deflection point and a maximal deflection point, respectively;
   a palette structure having a palette for selectively holding a standby workpiece and secured to a first end portion of the bed structure such that a palette loading is applied to the first end portion of the bed structure;
   a spindle assembly to which a machining tool is secured and secured to a second end portion opposite to the first end portion of the bed structure such that a spindle loading is applied to the bed structure;
   a table movably secured to the bed structure such that a manufacturing workpiece is secured to the table and a table loading is applied to a load point of the bed structure; and
   an automatic aligner automatically detecting a first installation error of the table and a second installation error of the spindle assembly and automatically correcting the first and the second installation errors such that the machining workpiece and the machining tool are aligned with each other,
   wherein the automatic aligner includes a position detecting unit detecting the bed heights of the bed structure and process positions of the bed structure at which the table is located, an error calculating unit for calculating the installation errors of the table and the spindle assembly according to the bed heights and the process positions and a driving unit for driving at least one of the table and the spindle assembly to correct the installation errors of the table and the spindle assembly.

2. The machining center of claim 1, wherein the position detecting unit includes a first detecting unit connected to the position sensors and detecting the bed heights from the ground and a second detecting unit detecting the process position at which the table is located as the load point, and the error calculating unit includes a deflection sensor detecting a deflection of the bed structure from the deflection curve as a bed slant and an error generator generating the first and the second installation errors from the bed slant.

3. The machining center of claim 2, wherein the load distribution is varied by palette loading, the table loading and the spindle loading and the position sensor includes a first gap sensor positioned under the maximal deflection point of the bed structure and a second gap sensor positioned under the minimal deflection point of the bed structure, and the bed structure is divided into a plurality of bed sections and the deflection curve is simplified into a discrete line in each bed section by a linear regression analysis such that the line includes:

a first deflection line having a first bed slant inclined at a first slant angle with respect to an original shape of the bed structure and extending downwards from the maximal deflection point to the minimal deflection point, the first slant angle being obtained by a following equation (1); and a second deflection line having a second bed slant inclined at a second slant angle with respect to the original shape of the bed structure and extending upwards from the minimal deflection point to the maximal deflection point, the second slant angle being obtained by a following equation (2), $$\theta_1 = \tan^{-1}\left(\frac{G_2 - G_1}{d_3 - d_1}\right) \quad (1)$$

$$\theta_2 = \tan^{-1}\left(\frac{h_2 - G_2}{d_4 - d_3}\right) \quad (2)$$

(wherein, θ1 represents the first slant angle, θ2 represents the second slant angle, h1 represents the bed height of the bed structure at the first end portion, h2 represents the bed height of the bed structure at the second end portion, G1 represents the bed height of the bed structure at the maximal deflection point, G2 represents the bed height of the bed structure at the minimal deflection point, d1 is a gap distance between the first end portion of the bed structure and the maximal deflection point, d3 is a gap distance between the first end portion of the bed structure and the minimal deflection point and d4 is a gap distance between the first end portion and the second end portion of the bed structure.

4. The machining center of claim 3, wherein when the second detecting unit detects the table at the load point satisfying a following equation (3), the error generator generates the first installation error and the second installation error as the first slant angle and the second slant angle, respectively, $$d_2 < d_3 - l\cos\frac{\theta_1}{2} \quad (3)$$

(wherein, l represents a length of the bed structure and d2 represents a gap distance between the first end portion of the bed structure and the load point of the table loading).

5. The machining center of claim 3, wherein when the second detecting unit detects the table at the load point satisfying a following equation (4), the error generator generates the first installation error and the second installation error as the second slant angle, $$d_2 > d_3 - l\cos\frac{\theta_1}{2} \quad (4)$$

(wherein, l represents a length of the bed structure and d2 represents a gap distance between the first end portion of the bed structure and the load point of the table loading).

6. The machining center of claim 3, wherein when the second detecting unit detects the table at the load point satisfying a following equation (5), the error generator generates the second installation error as the second slant angle and generates the first installation error as a supplementary angle of a slope of a table line in such a configuration that the table line passes a left contact point at which a left end of the table is contact with the bed structure deflected along a first deflection line and a right contact point at which a right end of the table is contact with the bed structure deflected along the second deflection line, $$d_3 - l\cos\frac{\theta_1}{2} < d_2 < d_3 + l\cos\frac{\theta_2}{2} \quad (5)$$

(wherein, l represents a length of the bed structure and d2 represents a gap distance between the first end portion of the bed structure and the load point of the table loading).

7. The machining center of claim 6, wherein the first installation error is calculated by a following equation (6), $$\alpha_1 = \tan^{-1}\left(\frac{\tan\theta_2(A\Delta x + B) + \frac{1}{2}\tan\theta_2\sqrt{C\Delta x^2 + D\Delta x + E} -}{l\sin\theta_1 + \Delta x\tan\theta_1}\right) - 90 \quad (6)$$

(wherein, l represents a length of the bed structure and Δx represents a horizontal component of a displacement of the left end of the table when a right end of the table move along a second deflection line, A=2 cos² θ₁(tan θ₁ tan θ₂−1), B=−2 cos²θ₁(l cos θ₁−l sin θ₁ tan θ₂), C=−3−2 tan θ₁ tan θ₂+tan²θ₁ tan² θ₂

D=2/(−cos θ₁+sin θ₁ tan θ₂+cos θ₁ tan θ₁ tan θ₂−sin θ₁ tan θ₁ tan²θ₂+4 sin²θ₁ cos θ₁)

E=l(l cos θ₁−2l sin θ₁ cos θ₁ tan θ₂+l sin²θ₁ tan²θ₂+8 cos³θ₁)).

8. The machining center of claim 2, wherein the load distribution is varied by palette loading, the table loading and the spindle loading and the position sensor includes a gap sensor positioned under the minimal deflection point of the bed structure, and the bed structure is divided into a pair of bed sections and the deflection curve is simplified into a discrete line in each bed section by a linear regression analysis such that the line includes:
a first deflection line having a first bed slant inclined at a first slant angle with respect to an original shape of the bed structure and extending downwards from the first end portion of the bed structure to the minimal deflection point, the first slant angle being obtained by a following equation (7); and
a second deflection line having a second bed slant inclined at a second slant angle with respect to the original shape of the bed structure and extending upwards from the minimal deflection point to the second end portion of the bed structure, the second slant angle being obtained by a following equation (8), $$\theta_1 = \tan^{-1}\left(\frac{h_1 - G}{d_3}\right) \quad (1)$$

$$\theta_2 = \tan^{-1}\left(\frac{h_2 - G}{d_4 - d_3}\right) \quad (2)$$

(wherein, θ1 represents the first slant angle, θ2 represents the second slant angle, h1 represents the bed height of the bed structure at the first end portion, h2 represents the bed height of the bed structure at the second end portion, G represents the bed height of the bed structure at the minimal deflection point, d3 is a gap distance between the first end portion of the bed structure and the minimal deflection point and d4 is a gap distance between the first end portion and the second end portion of the bed structure).

9. The machining center of claim 8, wherein when the second detecting unit detects the table at the load point satisfying a following equation (9), the error generator generates the first installation error and the second installation error as the first slant angle and the second slant angle, respectively, $$d_2 < d_3 - l\cos\frac{\theta_1}{2} \quad (9)$$

(wherein, l represents a length of the bed structure and d2 represents a gap distance between the first end portion of the bed structure and the load point of the table loading).

10. The machining center of claim 8, wherein when the second detecting unit detects the table at the load point satisfying a following equation (10), the error generator generates the first installation error and the second installation error as the second slant angle, $$d_2 > d_3 - l\cos\frac{\theta_1}{2} \quad (10)$$

(wherein, l represents a length of the bed structure and d2 represents a gap distance between the first end portion of the bed structure and the load point of the table loading).

11. The machining center of claim 8, wherein when the second detecting unit detects the table at the load point satisfying a following equation (11), the error generator generates the second installation error as the second slant angle and generates the first installation error as a supplementary angle of a slope of a table line in such a configuration that the table line passes a left contact point at which a left end of the table is contact with the bed structure deflected along a first deflection line and a right contact point at which a right end of the table is contact with the bed structure deflected along the second deflection line, $$d_3 - l\cos\frac{\theta_1}{2} < d_2 < d_3 + l\cos\frac{\theta_2}{2} \quad (11)$$

(wherein, l represents a length of the bed structure and d2 represents a gap distance between the first end portion of the bed structure and the load point of the table loading).

12. The machining center of claim 2, wherein the second detecting unit includes a servo motor for driving the table and a motor encoder detecting operation information of the servo motor.

13. The machining center of claim 2, wherein the error calculating unit further includes a palette sensor detecting whether or not the standby workpiece is hold in the palette from the bed height corresponding to the maximal deflection point.

14. The machining center of claim 2, wherein the deflection curve includes a continuous polynomial curve in the longitudinal direction and the error generator generates the first installation error as a slant angle of an instantaneous slope of the polynomial curve at the load point of the table loading and generates the second installation error as a slant angle of an instantaneous slope of the polynomial curve at the second end portion of the bed structure.

15. The machining center of claim 1, wherein the driving unit includes a table driver for rotating the table at a first correction angle and a spindle driver for rotating a transfer column of the spindle assembly at a second correction angle.

16. The machining center of claim 15, wherein the table driver and the spindle driver are operated complementary to each other under a condition that one of the first correction angle and the second correction angle includes a summation of the first installation error and the second installation error.

17. The machining center of claim 15, wherein the table driver and the spindle driver are simultaneously operated under a condition that the first correction angle includes the first installation error and the second correction angle includes the second installation error.

18. The machining center of claim 1, wherein the automatic aligner further includes a storing unit for storing configurations and installation specifications of the bed structure as digital data.

* * * * *